US009740583B1

(12) United States Patent
Brandwine

(10) Patent No.: US 9,740,583 B1
(45) Date of Patent: Aug. 22, 2017

(54) LAYERED KEYS FOR STORAGE VOLUMES

(71) Applicant: Amazon Technologies, Inc., Reno, NV (US)

(72) Inventor: Eric Jason Brandwine, Haymarket, VA (US)

(73) Assignee: Amazon Technologies, Inc., Reno, NV (US)

(*) Notice: Subject to any disclaimer, the term of this patent is extended or adjusted under 35 U.S.C. 154(b) by 180 days.

(21) Appl. No.: 13/625,647

(22) Filed: Sep. 24, 2012

(51) Int. Cl.
*G06F 3/00* (2006.01)
*G06F 11/20* (2006.01)

(52) U.S. Cl.
CPC .. *G06F 11/2056* (2013.01); *G06F 2221/2105* (2013.01)

(58) Field of Classification Search
CPC ...... G06F 11/2056; G06F 21/80; G06F 21/57; G06F 2221/2105; G06F 2221/2107; G06F 2221/2141; G06F 2221/2143; H04L 9/08; H04L 9/3234
USPC .......................... 713/189, 153, 193; 709/216
See application file for complete search history.

(56) References Cited

U.S. PATENT DOCUMENTS

| 8,364,985 | B1* | 1/2013 | Subramanian | G06F 21/78 709/223 |
| 2003/0115447 | A1* | 6/2003 | Pham | H04L 63/0428 713/153 |
| 2008/0147821 | A1* | 6/2008 | Dietrich | G06F 17/30206 709/216 |
| 2010/0036850 | A1* | 2/2010 | Garman | G06F 11/1448 707/636 |
| 2010/0246827 | A1* | 9/2010 | Lauter | G06F 21/6209 380/278 |
| 2011/0072224 | A1* | 3/2011 | Popovski | G06F 3/0611 711/162 |
| 2011/0131187 | A1* | 6/2011 | Prahlad | G06F 11/1451 707/674 |
| 2011/0173404 | A1* | 7/2011 | Eastman | G06F 11/1451 711/162 |
| 2011/0258404 | A1* | 10/2011 | Arakawa | G06F 3/0608 711/162 |
| 2012/0089798 | A1* | 4/2012 | Prahlad | G06F 11/1435 711/162 |
| 2012/0239624 | A1* | 9/2012 | Barnes | G06F 17/30079 707/645 |
| 2013/0086394 | A1* | 4/2013 | Shimmitsu | G06F 3/061 713/193 |

(Continued)

OTHER PUBLICATIONS

Wei et al., "Reliably Erasing Data From Flash-Based Solid State Drives," in *Proceedings of the 9th USENIX Conference on File Storage and Technologies*, FAST 2011, San Jose, CA, Feb. 15-17, 2011, 13 pages.

*Primary Examiner* — Joseph P Hirl
*Assistant Examiner* — Sayed Beheshti Shirazi
(74) *Attorney, Agent, or Firm* — Seed IP Law Group LLP

(57) ABSTRACT

Techniques are described for managing data storage. Users may create data storage volumes that may each be stored by a data storage service. In an embodiment, chunks that differ between related volumes may be encrypted with different encryption keys. One or more of the encryption keys may be deleted in response to a request to delete a volume or a data chunk, rendering the volume and/or the data chunk unusable. Other techniques are described in the drawings, claims, and text of the disclosure.

25 Claims, 13 Drawing Sheets

(56) References Cited

U.S. PATENT DOCUMENTS

2014/0019769 A1*  1/2014  Pittelko ............... G06F 11/1446
                                                713/189
2014/0047144 A1*  2/2014  Haga ..................... G06F 3/0605
                                                710/74

* cited by examiner

LAYERED KEYS FOR STORAGE VOLUMES

BACKGROUND

Many different computing applications rely on some type of storage medium for the persistent storage of various kinds of application data. For example, common office applications and multimedia applications generate and use application data of various types and formats, such as documents, spreadsheets, still images, audio and video data, among others. Frequently, such data is stored for repeated access or use on behalf of a user. For example, a user may wish to store and work with a number of documents or other data over a period of time, and may expect that the data will be readily available in a predictable state when needed.

In conventional computing systems, the storage medium used by applications for persistent application data storage is most commonly a magnetic fixed drive or "hard drive," although optical and solid-state storage devices are also used. Such devices are either integrated within a computer system that executes the applications or accessible to that system via a local peripheral interface or a network. Typically, devices that serve as application storage are managed by an operating system that manages device-level behavior to present a consistent storage interface, such as a file system interface, to various applications needing storage access.

This conventional model of application storage presents several limitations. First, it generally limits the accessibility of application data. For example, if application data is stored on the local hard drive of a particular computer system, it may be inaccessible to applications executing on other systems. Even if the data is stored on a network-accessible device, applications that execute on systems outside the immediate network may not be able to access that device. For example, for security reasons, enterprises commonly restrict access to their local area networks (LANs) such that systems external to the enterprise cannot access systems or resources within the enterprise. Thus, applications that execute on portable devices (e.g., notebook or handheld computers, personal digital assistants, mobile telephony devices, etc.) may experience difficulty accessing data that is persistently associated with fixed systems or networks.

The conventional application storage model also may fail to adequately ensure the reliability of stored data. For example, conventional operating systems typically store one copy of application data on one storage device by default, requiring a user or application to generate and manage its own copies of application data if data redundancy is desired. While individual storage devices or third-party software may provide some degree of redundancy, these features may not be consistently available to applications, as the storage resources available to applications may vary widely across application installations. The operating-system-mediated conventional storage model may also limit the cross-platform accessibility of data. For example, different operating systems may store data for the same application in different, incompatible formats, which may make it difficult for users of applications executing on one platform (e.g., operating system and underlying computer system hardware) to access data stored by applications executing on different platforms.

In some systems, such as archival, backup, or disaster recovery systems, a vast amount of data may need to be stored, though any particular piece of the stored data may be accessed only rarely. Magnetic tape systems are often used to store archival data. Magnetic tape drives, however, may be fragile and susceptible to adverse environmental conditions, such as heat and humidity. In addition, some magnetic tape drives have relatively high failure rates. Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of co-located interconnected computing systems have become commonplace, such as private data centers that are operated by and on behalf of a single organization, and public data centers that are operated by entities as businesses. Some public data center operators provide network access, power, and secure installation facilities for hardware owned by various customers, while other public data center operators provide "full service" facilities that also include hardware resources made available for use by their customers. However, as the scale and scope of typical data centers and computer networks has increased, the task of provisioning, administering, and managing the associated physical computing resources has become increasingly complicated.

DETAILED DESCRIPTION

Figure 1:
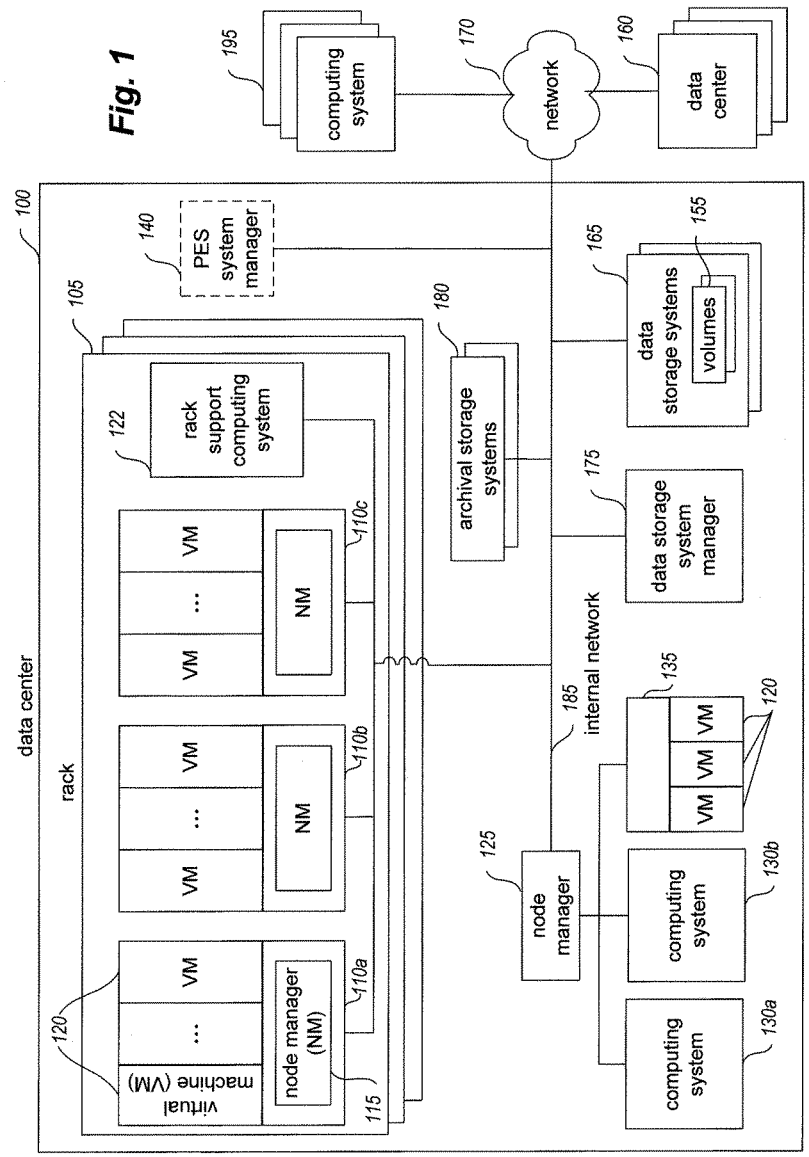
FIG. 1 is a block diagram illustrating one embodiment of a storage model for presenting storage to users as a web service.

In a data storage system, deleting a large volume can be difficult. The underling storage may have moved multiple times. Deleting the volume may just delete the current copy of the volume, and not previous copies. By encrypting the volume, the volume may effectively be deleted by deleting the key, which may be significantly smaller than a large volume (e.g., 128 bits). One reason to securely delete data is in response to a data spill. For example, sensitive data (e.g., classified government, proprietary business data, etc.) may appear in an inappropriate system. By identifying and shredding the appropriate key or keys, access to the data is denied, and the data may be reliably considered removed from the system. If all the children of a volume (e.g., child volumes, snapshots and volumes initialized from snapshots, which are supported by many data storage systems) use the same key as the primary volume, this may result in loss of all copies of the volume. By using a different key when each volume is created, access to copies using a different key or keys may be maintained.

For example, consider a case where a root volume is a base image for an operating system (e.g., a base machine image for an operating system) used within a program execution service. If all copies of the root volume use the same encryption key, shredding the key to delete a compromised copy would impact all running instances, as well as all snapshots and machine images derived from the root volume. This would be unacceptable for the program execution service and its customers. Using a different key for each new volume allows for deleting a key of a compromised volume without deleting all volumes and copies. As discussed in more detail below, in some embodiments a volume initialized off of a snapshot will have multiple keys, the keys associated with chunks of the snapshot which would remain the same, and a new key associated with new chunks of data encrypted and written in the volume.

Tracking and storing multiple keys may be necessary. In at least some embodiments, the keys may be stored with the snapshots, as discussed in more detail below. A snapshot manifest typically includes a list of all the chunks required to make a volume, and the keys associated with the chunks of the snapshot may be added to the snapshot manifest. When a new snapshot is taken (for example, each time a new volume is initialized in some embodiments), any new keys may be added to the previous snapshot manifest and the new snapshot persisted. When the snapshot is restored, the list of chunks along with all of the keys for decryption are available.

A non-exclusive list of examples of online storage services in which the described techniques may be used include the following: Amazon Elastic Block Store (EBS) that provides access to raw block storage devices, including to enable mounting a virtual local block storage device on a target computer system; Amazon Simple Storage Service (S3) that stores data of various types; Amazon Relational Database Service (RDS) that provides relational database functionality; Amazon SimpleDB that provides functionality to store key-value pairs; Amazon DynamoDB service that provides NoSQL database functionality; etc. The described techniques may be employed in data storage in which data groups incrementally differ from other groups (e.g., data storage systems supporting snapshots and volumes, incremental backup systems, etc.). Such data formats may include, for example, VHD ("Virtual Hard Disk"), VMDK ("Virtual Machine Disk"), VDI ("Virtual Disk Image"), OVF ("Open Virtualization Format"), differencing hard disk imaging, etc.

Furthermore, access to some or all of the described techniques may in some embodiments be provided in a fee-based or other paid manner to at least some users. For example, users may pay one-time fees, periodic (e.g., monthly) fees and/or one or more types of usage-based fees to use the data storage service to store, access and delete volumes, to use the program execution service to execute programs, and/or to use archival storage systems (e.g., provided by a long-term storage service) to store long-term backups or other snapshot copies of volumes. Fees may be based on one or more factors and activities, such as indicated in the following non-exclusive list: based on the size of a volume, such as to create the volume (e.g., as a one-time fee), to have ongoing storage and/or use of the volume (e.g., a monthly fee), to delete all copies of a volume (e.g., as a one-time fee), etc.; based on non-size characteristics of a volume, such as a number of mirror copies, characteristics of data storage systems (e.g., data access rates, storage sizes, etc.) on which the primary and/or mirror volume copies are stored, and/or a manner in which the volume is created (e.g., a new volume that is empty, a new volume that is a copy of an existing volume, a new volume that is a copy of a snapshot volume copy, etc.); based on the size of a snapshot volume copy, such as to create the snapshot volume copy (e.g., as a one-time fee) and/or have ongoing storage of the volume (e.g., a monthly fee); based on the non-size characteristics of one or more snapshot volume copies, such as a number of snapshots of a single volume, whether a snapshot copy is incremental with respect to one or more prior snapshot copies, etc.; based on usage of a volume, such as the amount of data transferred to and/or from a volume (e.g., to reflect an amount of network bandwidth used), a number of data access requests sent to a volume, a number of executing programs that attach to and use a volume (whether sequentially or concurrently), etc.; based on the amount of data transferred to and/or from a snapshot, such as in a manner similar to that for volumes; etc. In addition, the provided access may have various forms in various embodiments, such as a one-time purchase fee, an ongoing rental fee, and/or based on another ongoing subscription basis. Furthermore, in at least some embodiments and situations, a first group of one or more users may provide data to other users on a fee-based basis, such as to charge the other users for receiving access to current volumes and/or historical snapshot volume copies created by one or more users of the first group (e.g., by allowing them to make new volumes that are copies of volumes and/or of snapshot volume copies; by allowing them to use one or more created volumes; etc.), whether as a one-time purchase fee, an ongoing rental fee, or on another ongoing subscription basis.

In some embodiments, one or more APIs ("application programming interfaces") may be provided by a data storage service, program execution service and/or remote long-term storage service, such as to allow other programs to programmatically initiate various types of operations to be performed (e.g., as directed by users of the other programs). Such operations may allow some or all of the described types of functionality to be invoked, and include, but are not limited to, the following types of operations: to create, delete, attach, detach, or describe volumes; to create, delete, copy or describe snapshots; to specify access rights or other metadata for volumes and/or snapshots; to manage execution of programs; to provide payment to obtain other types of functionality; to obtain reports and other information about use of capabilities of one or more of the services and/or about fees paid or owed for such use; etc. The operations provided by the API may be invoked by, for example, executing programs on host computing systems of the program execution service and/or by computing systems of customers or other users that are external to the one or more geographical locations used by the data storage service and/or program execution service.

For illustrative purposes, some embodiments are described below in which specific types of data storage is provided in specific ways to specific types of programs executing on specific types of computing systems. These examples are provided for illustrative purposes and are simplified for the sake of brevity, and the inventive techniques can be used in a wide variety of other situations, some of which are discussed below, and the techniques are not limited to use with virtual machines, data centers or other specific types of data storage systems, computing systems or computing system arrangements. In addition, while some embodiments are discussed as providing and using reliable networked data storage, in other embodiments types of data storage other than networked storage may similarly be provided.

FIG. 1 is a network diagram illustrating an example embodiment in which multiple computing systems execute programs and access reliable networked data storage, such as under the control of a data storage service and/or program execution service. In particular, in this example, a program execution service manages the execution of programs on various host computing systems located within a data center 100, and a data storage service uses data storage systems to provide reliable networked data storage to those executing programs. Archival storage systems may also be used to store additional copies of at least some portions of at least some data storage volumes.

In this example, data center 100 includes a number of racks 105, and each rack includes a number of host computing systems 110a-c, as well as an optional rack support computing system 122 in this example embodiment. The host computing systems 110a-c on the illustrated rack 105 each host one or more virtual machines 120 in this example, as well as a distinct node manager (NM) module 115 associated with the virtual machines on that host computing system to manage those virtual machines. One or more other host computing systems 135 also each host one or more virtual machines 120 in this example. Each virtual machine 120 may act as an independent computing node for executing one or more program copies (not shown) for a user (not shown), such as a customer of the program execution service. In addition, this example data center 100 further includes additional host computing systems 130a-b that do not include distinct virtual machines, but may nonetheless each act as a computing node for one or more programs (not shown) being executed for a user. In this example, a node manager module 125 executing on a computing system (not shown) distinct from the host computing systems 130a-b and 135 is associated with those host computing systems to manage the computing nodes provided by those host computing systems, such as in a manner similar to the node manager modules 115 for host computing systems 110. The rack support computing system 122 may provide various utility services for other computing systems local to its rack 105 (e.g., long-term program storage, metering and other monitoring of program execution and/or of networked data storage access performed by other computing systems local to the rack, etc.), as well as possibly to other computing systems located in the data center. Each computing system 110, 130 and 135 may also have one or more local attached storage devices (not shown), such as to store local copies of programs and/or data created by or otherwise used by the executing programs, as well as various other components.

In this example, an optional computing system 140 is also illustrated that executes a PES system manager module for the program execution service to assist in managing the execution of programs on the computing nodes provided by the host computing systems located within the data center (or optionally on computing systems located in one or more other data centers 160, or other remote computing systems 195 external to the data center). As discussed in greater detail elsewhere, a PES system manager module may provide a variety of services in addition to managing execution of programs, including the management of user accounts (e.g., creation, deletion, billing, etc.); the registration, storage, and distribution of programs to be executed; the collection and processing of performance and auditing data related to the execution of programs; the obtaining of payment from customers or other users for the execution of programs; etc. In some embodiments, the PES system manager module may coordinate with the node manager modules 115 and 125 to manage program execution on computing nodes associated with the node manager modules, while in other embodiments the node manager modules 115 and 125 may not assist in managing such execution of programs.

This example data center 100 also includes a computing system 175 that executes a data storage ("DS") system manager module for the data storage service to assist in managing the availability of networked data storage to programs executing on computing nodes provided by the host computing systems located within the data center (or optionally on computing systems located in one or more other data centers 160, or other remote computing systems 195 external to the data center). In particular, in this example, the data center 100 includes a pool of multiple data storage systems 165, which each have local storage for use in storing one or more volume copies 155. Access to the volume copies 155 is provided over the internal network(s) 185 to programs executing on computing nodes 120 and 130. In addition, the data center 100 includes one or more archival storage systems 180 with which the data storage service may interact, such as under control of one or more archival manager modules (see archival manager 190 of FIG. 2B), as discussed in more detail below.

A DS system manager module may provide a variety of services related to providing networked data storage functionality, including the management of user accounts (e.g., creation, deletion, billing, etc.); the creation, use and deletion of data storage volumes and snapshot copies of those volumes; the collection and processing of performance and auditing data related to the use of data storage volumes and snapshot copies of those volumes; the obtaining of payment from customers or other users for the use of data storage volumes and snapshot copies of those volumes; etc. In some embodiments, the DS system manager module may coordinate with the node manager modules 115 and 125 to manage use of volumes by programs executing on associated computing nodes, while in other embodiments the node manager modules 115 and 125 may not be used to manage such volume use. In addition, in other embodiments, one or more DS system manager modules may be structured in other manners, such as to have multiple instances of the DS system manager executing in a single data center (e.g., to share the management of networked data storage by programs executing on the computing nodes provided by the host computing systems located within the data center), and/or such as to have at least some of the functionality of a DS system manager module being provided in a distributed manner by software executing on some or all of the data storage systems 165 (e.g., in a peer-to-peer manner, without any separate centralized DS system manager module on a computing system 175).

In this example, the various host computing systems 110, 130 and 135, data storage systems 165, archival storage systems 180, and computing systems 125, 140 and 175 are interconnected via one or more internal networks 185 of the data center, which may include various networking devices (e.g., routers, switches, gateways, etc.) that are not shown. In addition, the internal networks 185 are connected to an external network 170 (e.g., the Internet or other public network) in this example, and the data center 100 may further include one or more optional devices (not shown) at the interconnect between the data center 100 and an external network 170 (e.g., network proxies, load balancers, network address translation devices, etc.). In this example, the data center 100 is connected via the external network 170 to one or more other data centers 160 that each may include some or all of the computing systems and storage systems illustrated with respect to data center 100, as well as other remote computing systems 195 external to the data center. The other computing systems 195 may be operated by various parties for various purposes, such as by the operator of the data center 100 or third parties (e.g., customers of the program execution service and/or of the data storage service). In addition, one or more of the other computing systems 195 may be archival storage systems (e.g., as part of a remote network-accessible storage service) with which the data storage service may interact, such as under control of one or more archival manager modules (not shown) that execute on the one or more other computing systems 195. Furthermore, while not illustrated here, in at least some embodiments, at least some of the data storage systems 165 and/or archival storage systems 180 may further be inter-connected with one or more other networks or other connection mediums, such as a high-bandwidth connection over which the data storage systems 165 may share volume data (e.g., for purposes of replicating copies of volumes and/or maintaining consistency between primary and mirror copies of volumes), with such a high-bandwidth connection not being available to the various host computing systems 110, 130 and 135 in at least some such embodiments.

It will be appreciated that the example of FIG. 1 has been simplified for the purposes of explanation, and that the number and organization of host computing systems, data storage systems and other devices may be much larger than what is depicted in FIG. 1. For example, as one illustrative embodiment, there may be approximately 4000 computing systems per data center, with at least some of those computing systems being host computing systems that may each host 15 virtual machines, and/or with some of those computing systems being data storage systems and/or archival storage systems that may each store several volume copies and/or snapshots. If each hosted virtual machine executes one program, then such a data center may execute as many as sixty thousand program copies at one time. Furthermore, hundreds or thousands (or more) volumes may be stored on the data storage systems, depending on the number of data storage systems, size of the volumes, and number of mirror copies per volume. It will be appreciated that in other embodiments, other numbers of computing systems, programs and volumes may be used.

Figure 2A:
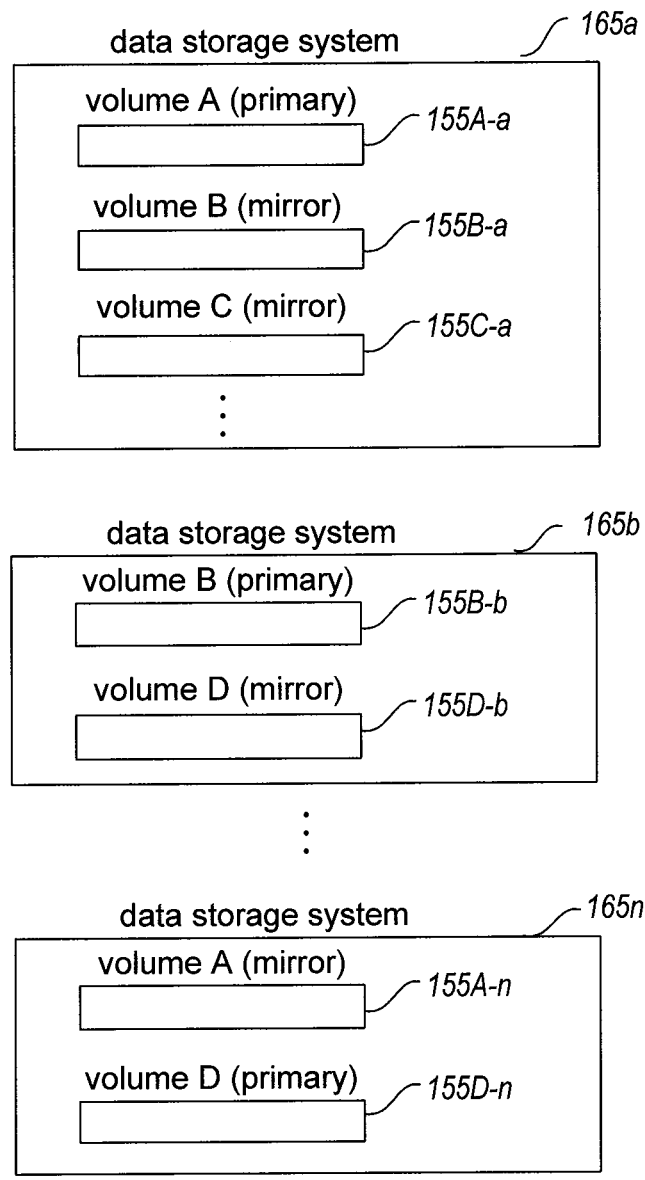
FIGS. 2A-2F illustrate examples of providing reliable data storage functionality to clients.
Figure 2B:
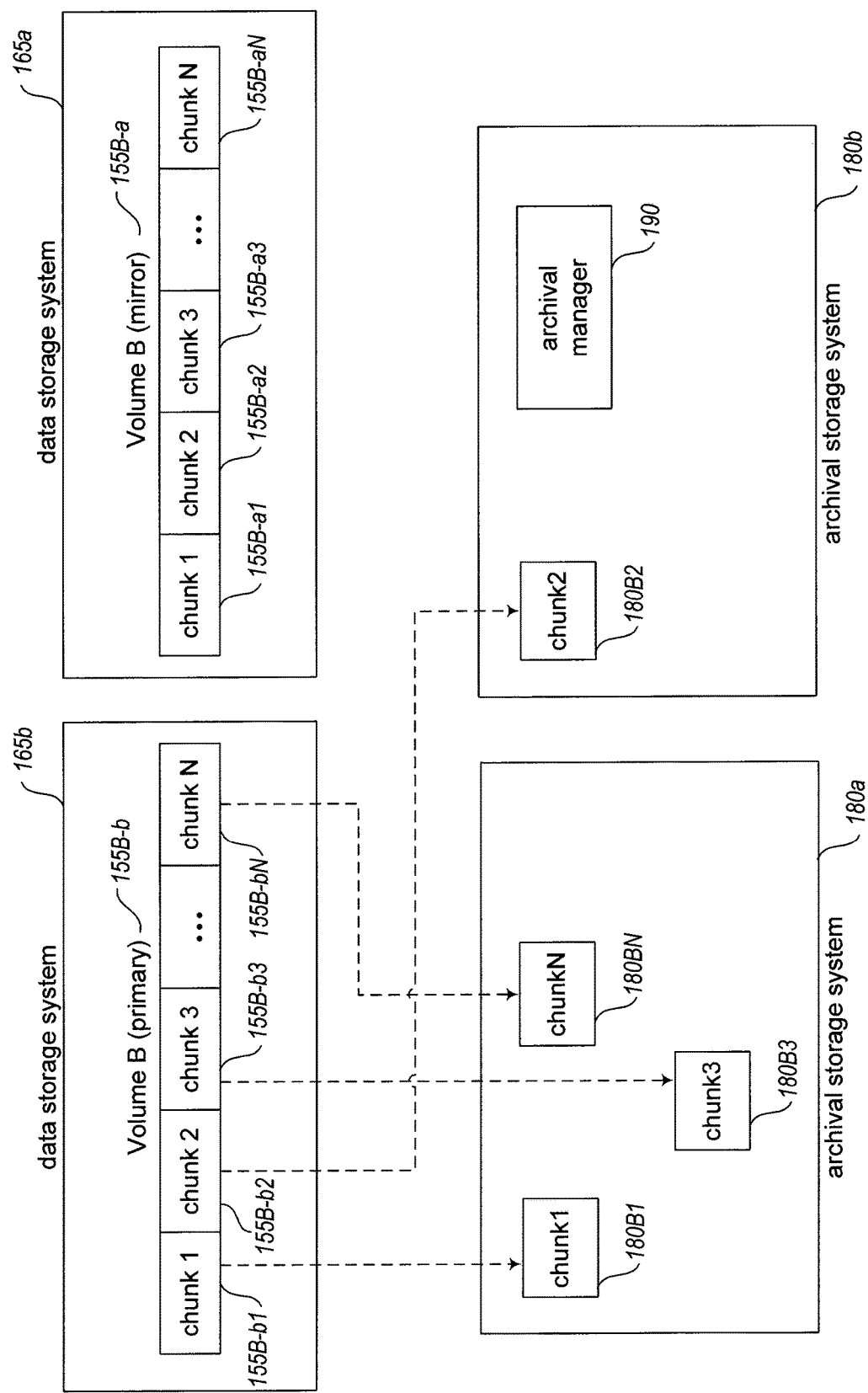
Figure 2C:
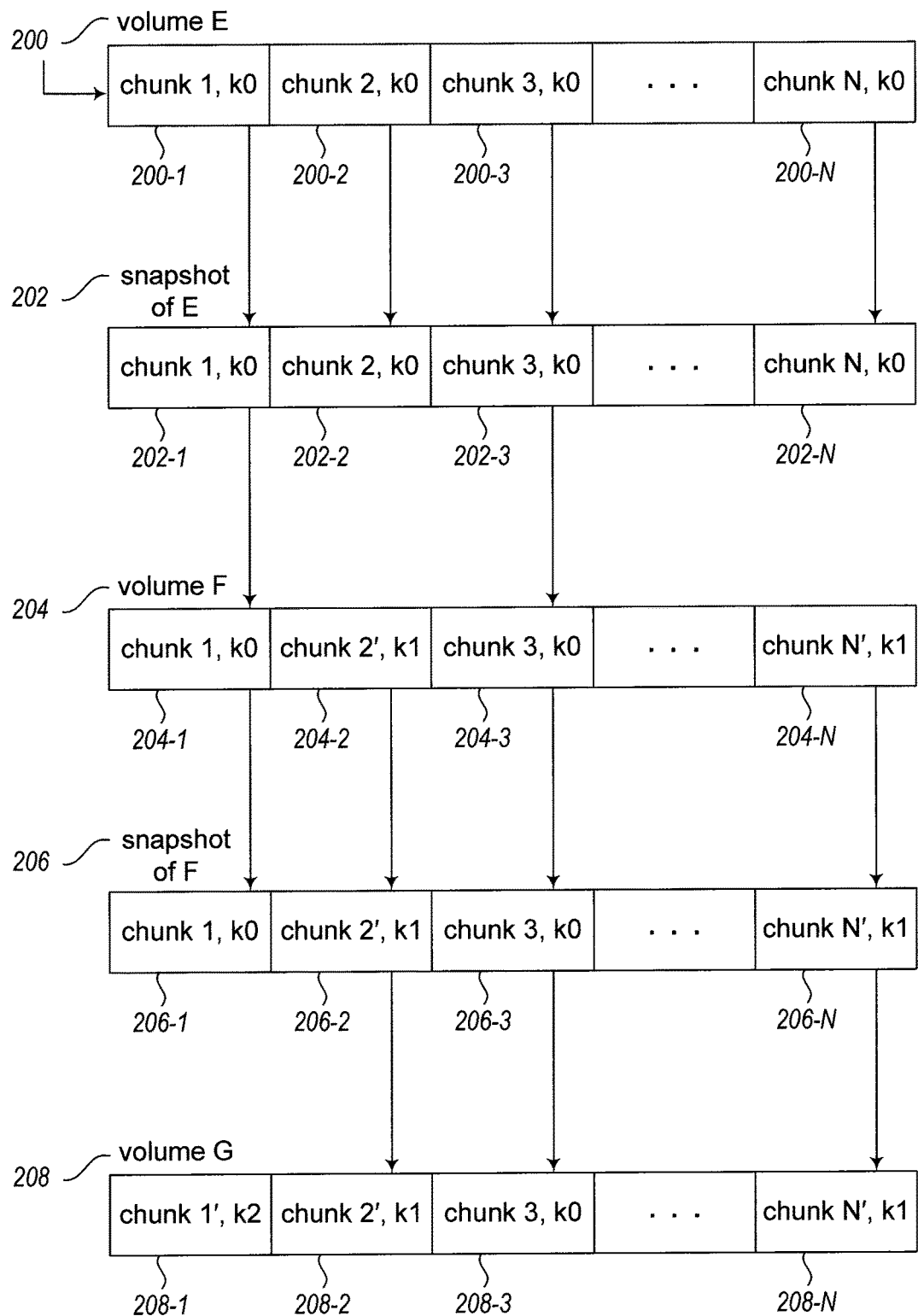
Figure 2D:
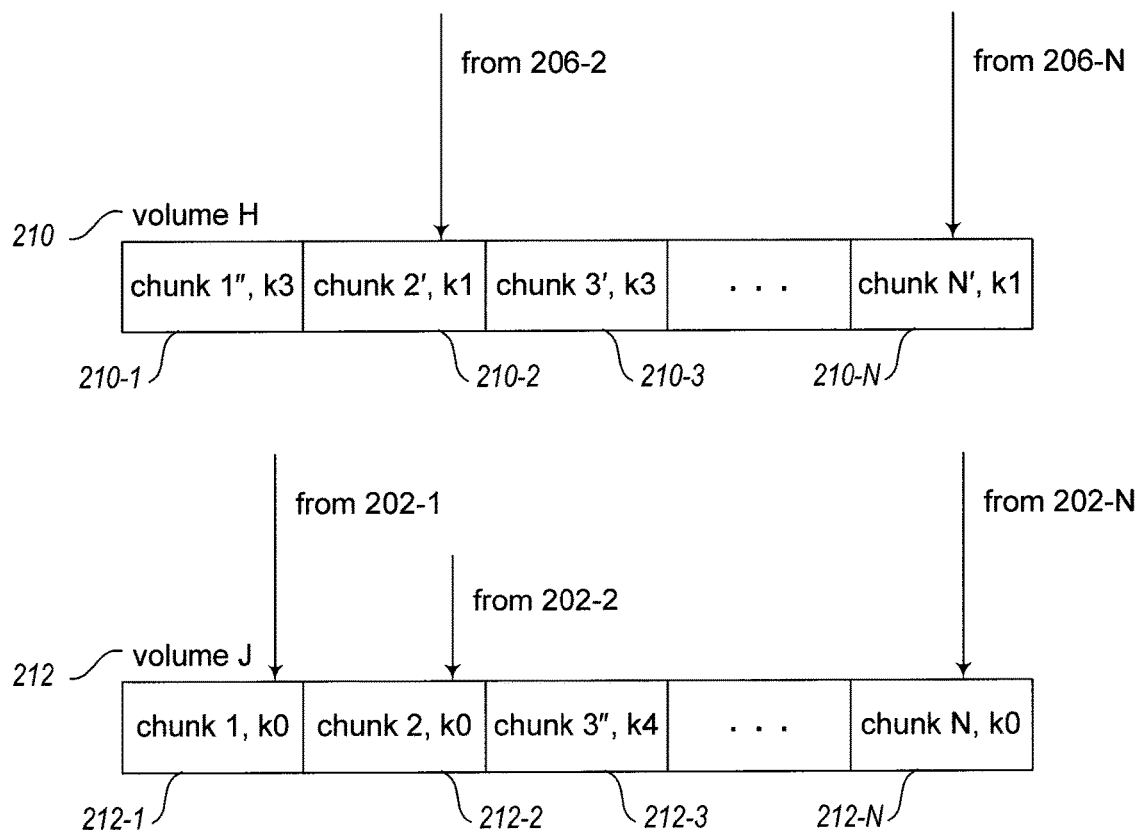
Figure 2E:
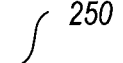
Figure 2F:
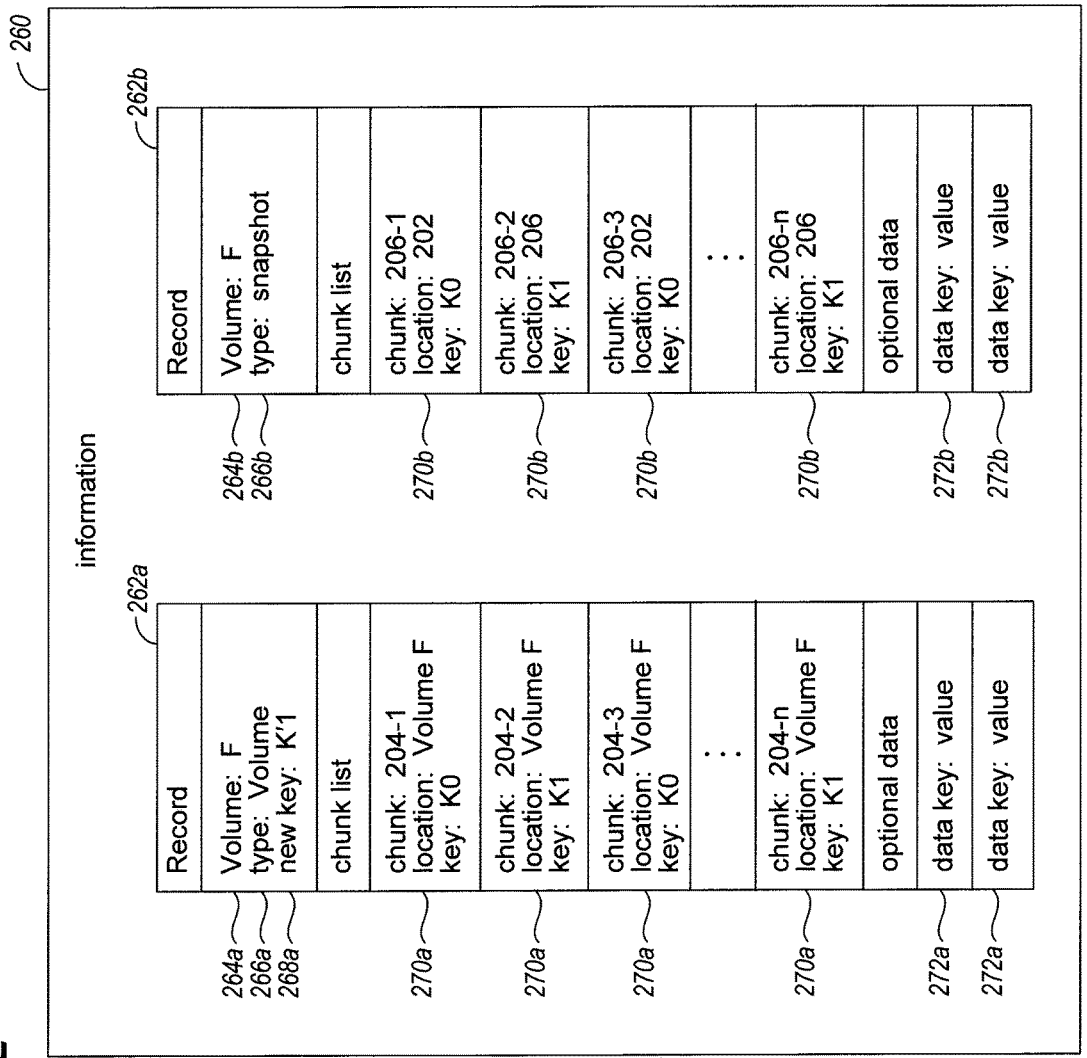

FIGS. 2A-2F illustrate examples of providing reliable data storage functionality to clients. In particular, FIG. 2A illustrates an example of a data storage computing system that may be used to provide reliable networked data storage functionality to clients (e.g., executing programs), such as on behalf of a data storage service, FIG. 2B illustrates examples of using archival storage systems to store at least some portions of some data storage volumes, FIGS. 2C and 2D illustrate an example of creating volumes and snapshots, FIG. 2E illustrates an example of storing information related to created snapshots in a snapshot manifest, such as information identifying chunks and associated encryption keys, and FIG. 2F illustrates an example of storing information related to volumes and snapshots in records.

In this example, FIG. 2A illustrates several data storage systems 165 that each store one or more volume copies 155, such as with each volume having a primary copy and at least one mirror copy. In other embodiments, other arrangements may be used, such as by having multiple primary volume copies (e.g., with all of the primary volume copies being available for simultaneous read access by one or more programs) and/or by having multiple mirror volume copies. The example data storage systems 165 and volume copies 155 may, for example, correspond to a subset of the data storage systems 165 and volume copies 155 of FIG. 1.

In this example, the data storage system 165a stores at least three volume copies, including the primary copy 155A-a for volume A, a mirror copy 155B-a for volume B, and a mirror copy 155C-a for volume C. One or more other volume copies that are not illustrated in this example may further be stored by the data storage system 165a, as well as by the other data storage systems 165. Another example data storage system 165b stores the primary copy 155B-b for volume B in this example, as well as a mirror copy 155D-b for volume D. In addition, example data storage system 165n includes a mirror copy 155A-n of volume A and a primary copy 155D-n of volume D. Thus, if an executing program (not shown) is attached to and using volume A, the node manager for that executing program will be interacting with data storage system 165a to access the primary copy 155A-a for volume A, such as via data storage system software (not shown) that executes on the data storage system 165a. Similarly, for one or more executing programs (not shown) attached to and using volumes B and D, the node manager(s) for the executing program(s) will interact with data storage systems 165b and 165n, respectively, to access the primary copies 155B-b for volume B and 155D-n for volume D, respectively. In addition, other data storage systems may further be present (e.g., data storage systems 165c-165m and/or 165o and beyond), and may store the primary volume copy for volume C and/or other primary and mirror volume copies, but are not shown in this example. Thus, in this example, each data storage system may store more than one volume copy, and may store a combination of primary and mirror volume copies, although in other embodiments volumes may be stored in other manners.

FIG. 2B illustrates examples of using archival storage systems 180 to store at least some portions of some data storage volumes. In this example, FIG. 2B illustrates multiple data storage systems 165 that each store one or more volume copies 155, such as to correspond to the example data storage systems 165 illustrated in FIG. 2A. FIG. 2B further illustrates multiple archival storage systems 180, which may, for example, correspond to a subset of the archival storage systems 180 of FIG. 1. In particular, in this example, FIG. 2B illustrates data storage systems 165a and 165b of FIG. 2A, although in this example only the primary and mirror copies of volume B are illustrated for those data storage systems. As discussed with respect to FIG. 2A, the data storage system 165b stores the primary copy 155B-b of volume B, and data storage system 165a stores the mirror copy 155B-a of volume B.

In the example of FIG. 2B, a user associated with volume B has requested that a new initial snapshot copy of volume B be stored on remote archival storage systems, such as for long-term backup. Accordingly, volume B has been separated into multiple chunk portions that will each be stored separately by the archival storage systems, such as to correspond to a typical or maximum storage size for the archival storage systems, or instead in another manner as determined by the data storage service. In this example, the primary copy 155B-b of volume B has been separated into N chunks 155B-b1 through 155B-bN, and the mirror copy 155B-a of volume B similarly stores the same data using chunks 155B-a1 through 155B-aN. Each of the N chunks of volume B is stored as a separate data chunk on one of two example archival storage systems 180a and 180b, and thus those multiple corresponding stored data chunks in aggregate form the initial snapshot volume copy for volume B. In particular, chunk 1 155B-b1 of the primary volume B copy is stored as chunk 180B1 on archival storage system 180a, chunk 2 155B-b2 is stored as chunk 180B2 on archival storage system 180b, chunk 3 155B-b3 is stored as chunk 180B3 on archival storage system 180a, and chunk N 155B-bN is stored as chunk 180BN on archival storage system 180a. In this example, the separation of volume B into multiple chunks is performed by the data storage service, such that individual chunks of volume B may be individually transferred to the archival storage systems, although in other embodiments the entire volume B may instead be sent to the archival storage systems, which may then separate the volume into multiple chunks or otherwise process the volume data if so desired.

In addition, in this example, the archival storage system 180b is an archival storage computing system that executes an archival manager module 190 to manage operations of the archival storage systems, such as to manage the storage and retrieval of data chunks, to track which stored data chunks correspond to which volumes, to separate transferred volume data into multiple data chunks, to meter and otherwise track use of the archival storage systems, etc. The archival manager module 190 may, for example, maintain a variety of information about the various data chunks that correspond to a particular volume, such as for each snapshot copy of the volume or child volumes, for example as discussed in greater detail with respect to FIGS. 2C-2F, while in other embodiments such snapshot volume copy information may instead be maintained in other manners (e.g., by the data storage systems or other modules of the data storage service). In other embodiments, only a single archival storage system may be used, or instead the data chunks corresponding to chunks of volume B may be stored across many more archival storage systems (not shown). In addition, in other embodiments, each archival storage system may execute at least part of an archival manager module, such as for each archival storage system to have a distinct archival manager module, or for all of the archival storage systems to provide the functionality of the archival manager module in a distributed peer-to-peer manner. In other embodiments, one or more archival manager modules may instead execute on one or more computing systems that are local to the other data storage service modules (e.g., on the same computing system or a proximate computing system to one that executes a DS system manager module), or the operations of the archival storage systems may instead be managed directly by one or more other modules of the data storage service without using an archival manager module (e.g., by a DS system manager module).

FIGS. 2C and 2D illustrate an example of using one or more encryption keys to facilitate secure deletion of volumes and snapshots in the context of the creation of various volumes and snapshots. In this example, a initial volume E 200 has been separated into N chunks 200-1 through 200-N, each chunk being encrypted such that it may be decrypted using an encryption key, which as illustrated is a same encryption key k0 (which may be a same key used to encrypt chunks 200-1 through 200-N, part of a key pair used to encrypt chunks 200-1 through 200-N, etc.).

A snapshot 202 of volume E is taken. In an embodiment, chunks of a snapshot are copied from volume E or a reference to the chunks is stored in the snapshot 202, and thus may be decrypted using the same encryption keys of the corresponding chunks of the volume of which the snapshot was taken. Thus, snapshot 202 of volume E as illustrated comprises N chunks 202-1 through 202-N copied from volume E, each of which may be decrypted using encryption key k0.

A new volume F 204 is then initialized or constructed using chunks of snapshot 202 (e.g., by copying or referencing chunks of snapshot 202) and new chunks (e.g., modified chunks of snapshot 202, new data chunks to be written in volume F, etc.). In an embodiment, chunks from a previous snapshot or volume may be decrypted using the encryption key of the previous snapshot of volume, while new chunks (e.g., chunks which are modified or created when the new volume is created) may be decrypted using a new encryption key associated with new chunks of the new volume. As illustrated, chunk 1 202-1 of snapshot 202 is used to construct chunk 1 204-1 of volume F 204 and chunk 3 202-3 of snapshot 202 is used to construct chunk 3 204-3 of volume F 204, while chunk 2' 204-2 and chunk N' 204-N of volume D 204 are new chunks that are associated with a new encryption key that is associated with volume F. Thus, chunk 1 204-1 and chunk 3 204-3 of volume F 204 may be decrypted using encryption key k0, and new chunk 2' 204-2 and new chunk N' 204-N of volume F 204 may be decrypted using new encryption key k1. In an example embodiment, the key K1 could be an asymmetric key pair or a symmetric key (e.g., K1 may be the same key as the key used to encrypt chunks 2' 204-2 and chunk N' 204-N or part of a key pair used to encrypt chunks 2' 204-2 and chunk N' 204-N.).

A snapshot of volume F 204 is then taken, generating snapshot 206. As all of the chunks of snapshot 206 are used to create volume F 204, the same encryption keys for decrypting are associated with the corresponding chunks. As illustrated, chunk 1 206-1 may be decrypted using encryption key k0, chunk 2' 206-2 may be decrypted using encryption key k1, chunk 3 206-3 may be decrypted using encryption key k0, and chunk N' 206-N may be decrypted using encryption key k1.

Continuing with the description of FIG. 2C, a new volume G 208 may be created from the snapshot 206 of volume F 204 and volume G 208 may be associated with another encryption key or key pair. In this example, suppose that chunk 1 is modified and becomes Chunk 1' 208-1 of volume G 208. In this example Chunk 1' is new, and thus may be decrypted using the encryption key associated with volume G; chunk 2' 208-2 of volume G 208 is from chunk 2' 206-2 of snapshot 206, chunk 3 208-3 of volume G 208 is from snapshot 206, and chunk N' 208-N of volume G 208 is from snapshot 206. Thus, chunk 1' 208-1 of volume G may be decrypted using new encryption key k2, chunk 2' 208-2 may be decrypted using encryption key k1, chunk 3 208-3 may by decrypted using encryption key k0, and chunk N' 208-N may be decrypted using encryption key k1.

Referring to FIG. 2D, suppose another new volume H 210 is then created from the snapshot 206 of volume F 204. Chunk 1" 210-1 of volume H 210 is new, and thus may be decrypted using new encryption key k3; chunk 2' 210-2 of volume H 210 is from chunk 2' 206-2 of snapshot 206, and is thus may be decrypted using encryption key k1; chunk 3' 210-3 of volume H 210 is new, and thus may be decrypted using encryption key k3; and chunk N' 210-N of volume H 210 is from snapshot 206, and thus may be decrypted using encryption key k1.

Another new volume J 212 is then created from the snapshot 202 of volume E 200. Chunk 1 212-1 of volume J 212 is from chunk 1 202-1 of snapshot 202, and thus may be decrypted using encryption key k0; chunk 2 212-2 of volume J 212 is from chunk 2 202-2 of snapshot 202, and thus may be decrypted using encryption key k0; chunk 3" 212-3 is new, and thus may be decrypted using encryption key k4; and chunk N 212-N is from chunk N 202-N of snapshot 202, and thus may be decrypted using encryption key k0.

FIG. 2E illustrates an embodiment of information 250 that may be maintained by, for example, a data storage system manager such as the data system storage manager 175 of FIG. 1, a archival manager, such as the archival manager 190 of FIG. 2B, etc. (e.g., stored on data storage systems 165, on archival data storage system 180b, or elsewhere) and is shown to provide information about a volume snapshot copy stored on data storage systems, on archival storage systems, or elsewhere. In particular, in this example, the information 250 includes multiple rows 250a-1 to 250a-N, which each correspond to a distinct chunk of a snapshot volume copy. The information 250 may be stored, for example, as part of a snapshot volume copy manifest, which in some embodiments may be maintained for each volume created by a data storage system, or for selected volumes created by a data storage systems (e.g., volumes which are designated as secure or classified and their progeny).

Each of the rows of information in this example includes a volume identifier, an identifier for a snapshot, a chunk identifier, an encryption key or key pair associated with the identified chunk (e.g., a key which may be employed to decrypt the chunk). As illustrated, the information 250 corresponds to the example snapshot of Volume F 206 of FIG. 2C. Thus, row 250a-1 corresponds to chunk 206-1 of snapshot 206, row 250a-2 corresponds to chunk 206-2 of snapshot 206, row 250a-3 corresponds to chunk 206-3 of snapshot 206 and row 250a-N corresponds to chunk 206-N of snapshot 206. As all of the data chunks of snapshot 206 are constructed from volume F 204, all of the chunks 206-1 through 206-N of the snapshot copy 206 are associated with the encryption key of the corresponding chunk of volume F 204. In particular, chunk 206-1 is associated with key k0, chunk 206-2 is associated with key k1, chunk 206-3 is associated with key k0 and chunk 206-N is associated with key k1.

The information 250 may be stored and organized in various manners and in some embodiments not all of the information may be stored and/or additional information may be stored. For example, a pointer or an index to an encryption key may be stored instead of a key, with the key being stored, for example, by a key server (not shown), a data storage system (see data storage system 165 of FIG. 1), an archival storage system (see archival storage system 180 of FIG. 1), etc. In another example, a pointer or index to a location of a chunk (e.g., a pointer to a chunk of a previous volume or snapshot, such as a chunk of a parent volume) may be stored instead of a chunk encryption key associated with the chunk.

FIG. 2F illustrates an embodiment of information 260 that may be maintained by, for example, a data storage system manager such as the data storage system manager 175 of FIG. 1 (e.g., stored on data storage systems 165 and is shown to provide information about volumes stored on one or more data storage systems, or elsewhere). In particular, in this example, the information 260 includes multiple records which contain information about stored volumes and/or snapshots. As illustrated, the information 260 contains two records 262a and 262b. The information 260 may contain additional records and other types of records and may store information in various forms in addition to or instead of storing information as data records.

As illustrated, record 262a corresponds to Volume F of FIG. 2C and includes a volume identifier 264a, which is a string identifying a volume associated with the record, as illustrated Volume F, a record type 266a, which is a string identifying whether the record is associated with a volume or a volume snapshot, which as illustrated indicates the record is a volume, and an indication of a new key associated with the volume 268a, as illustrated key k1, which is a key that may be used to decrypt chunks which are encrypted or reencrypted to be written to the volume F.

Record 262a also includes a chunk list, which as illustrated is organized as a series of data sets 270a, each including a chunk identifier, a chunk location, and an indication of a chunk encryption key which may be employed to decrypt the chunk. Record 262a also includes optional data 272a, which as illustrated is organized as a series of data key-value pairs. The optional data may include, for example, information about users who may access, modify, or delete a volume associated with the record, volume attachment information, etc. Records may not contain all of the information shown in record 262a, may contain additional information not shown in record 262a, and may organize the information in other manners. For example, in an embodiment where a volume always contains its own copy of each data chunk, identifying the chunk may be sufficient to identify the location of the chunk and the location information may be omitted from the chunk list. In another example, a record may reference a snapshot manifest instead of including a chunk list.

As illustrated, record 262b corresponds to the snapshot of F 206 of FIG. 2C. Record 262b includes a volume identifier 264b, which is a string identifying a volume associated with the record, as illustrated Volume F, and a record type 266b, which is a string identifying whether the record is associated with a volume or a volume snapshot, which as illustrated indicates the record is a snapshot. As illustrated, the indication of a new key associated with the volume F is omitted from record 262b. Record 262b also includes a chunk list, which as illustrated is organized as a series of data sets 270b, each including a chunk identifier, a chunk location, and an indication of a chunk encryption key which may be employed to decrypt the chunk. Record 262b also includes optional data 272b, which as illustrated is organized as a series of data key-value pairs. The optional data may include, for example, information about users who may access, modify, or delete a volume associated with the record. Records may not contain all of the information shown in record 262b, may contain additional information not shown in record 262b, and may organize the information in other manners.

For ease of illustration, FIGS. 2C through 2F are shown and discussed above as though all snapshots and volumes that are created in part from a volume (e.g., children volumes and snapshots) are comprised of a same number N of chunks. In some embodiments, volumes and snapshots may each comprise different numbers of chunks (e.g., a snapshot may be an incremental snapshot rather than a full copy, and save only chunks that have changed since the last snapshot, and thus may have fewer chunks than the corresponding volume with the location of the other chunks being specified in a snapshot manifest, a volume initialized from a snapshot may have additional chunks, etc.).

While not illustrated in this example, the information 250 and the information 260 may include a variety of other types of information about the volumes and snapshot volume copies, including information about which system stores each of the data chunks, information about who is allowed to access the volume or snapshot volume copy information and under what circumstances, etc. As one example, in some embodiments, some users may create snapshot volume copies and make access to those snapshot volume copies available to at least some other users in at least some circumstances, such as on a fee-based basis to allow the other users to create copies of one or more particular snapshot volume copies. If so, such access-related information may be stored in information 250, information 260 or elsewhere, and the data storage system manager 175 or the archival manager module 190 may use such information to determine whether to satisfy requests made for information corresponding to particular volumes or snapshot volume copies. In some embodiments, the information 250 and/or the information 260 may be stored in whole or in part in an encrypted form. For example, it may be impossible to reconstruct a volume from a snapshot without decrypting an encrypted manifest.

The information 250 and the information 260 may be used by a data storage system and/or archival storage system to securely delete chunks, volumes or snapshots. In the following examples discussed in the context of FIGS. 2C-2E, for ease of illustration it is assumed that N is four, that is, all of the volumes and snapshot copies of volumes have four chunks. In addition, for ease of illustration, it is assumed that all of the volumes and snapshots comprise copies of the data chunks, instead of references to other another copy of a data chunk. If, for example, it is determined that chunk 2' 204-2 of volume F is compromised (e.g., has become infected at some point), key k1, which is associated with chunk 2', may be deleted. This will prevent access to chunks 204-2, 204-N, 206-2, 206-N, 208-2, 208-N, 210-2, 210-3, and 210-N because it will not be possible to decrypt these chunks without encryption key k1. In some embodiments, this will render volume F 204, snapshot 206, volume G 208 and volume H 210 unusable, and will effectively securely delete those volumes in their entirety (e.g., if all the chunks of, for example, volume F are chunks of an executable program). In some embodiments, this will render only the individual chunks associated with encryption key k1 securely deleted. The deletion of key k1 will not impact access to volume E, snapshot 202 and volume J (e.g., it will be possible to decrypt all of the chunks of volume E, snapshot 202 and volume J).

In another example, if it is determined that chunk 1' 208-1 of volume G is compromised, key k2 associated with volume G may be deleted. This will prevent access to chunk 208-1, as it will no longer be possible to decrypt chunk 208-1. In some embodiments, this will render volume G unusable. In some embodiments, only chunk 208-1 will be impacted or only portions of volume G associated with chunk 208-1 will be impacted. The deletion of key k2 will not impact volume E, snapshot 202, snapshot 206, volume H and volume J (e.g., it will be possible to decrypt all of the chunks of volume E, snapshot 202, snapshot 206, volume H and volume J).

In another example, if chunk 3" 212-3 of volume J 212 is compromised, key k4 may be deleted. This will prevent access to chunk 3" 212-3, as it will no longer be possible to decrypt chunk 3" 212-3. In some embodiments, this will render volume J unusable. In some embodiments, only portions of volume J associated with chunk 212-3 will be impacted as no other chunks need to use key k4 for decryption. The deletion of key k4 will not impact volume E, snapshot 202, snapshot 206, volume G and volume H (e.g., it will be possible to decrypt all of the chunks of volume E, snapshot 202, snapshot 206, volume G and volume H).

In another example, if any chunks of volume E or snapshot 202 are determined to be compromised, key k0 may be deleted. This will prevent access to all of the chunks of volume E and snapshot 202, as well as access to chunks 204-1, 204-3, 206-1, 206-3, 208-3, 212-1, 212-2 and 212-N, as it will no longer be possible to decrypt these chunks. In some embodiments, this will render volume E, snapshot 202, volume F, snapshot 206, volume G and volume J unusable. In some embodiments, only portions of volumes and snapshots associated with chunks decryptable using encryption key k0 will be impacted. The deletion of encryption key k0 will not impact volume H (e.g., it will be possible to decrypt all of the chunks of volume H).

It is noted that additional techniques may be performed when it is desired to securely delete data. For example, in response to an indication that chunk 2' 210-2 of volume H is compromised, before deleting key k1 additional techniques may be performed. For example, a new volume may be initiated from snapshot 206 (an intermediate node between volume F, in which chunks were first associated with encryption key k1, and volume H). The chunks of snapshot 206 may be decrypted and re-encrypted in the new volume (not shown) using a new encryption key associated with the new volume, before key k1 is deleted (e.g. all chunks of the new volume would be treated as new chunks). This facilitates saving an intermediate node when a compromised volume tree is pruned.

It will be appreciated that the examples of FIGS. 2A-2F have been simplified for the purposes of explanation, and that the number and organization of data storage systems, archival storage systems, and other devices may be much larger or otherwise different than what is depicted. Similarly, in other embodiments, primary volume copies, mirror volume copies, child volume copies and/or snapshot volume copies may be stored and managed in other manners.

Figure 3:
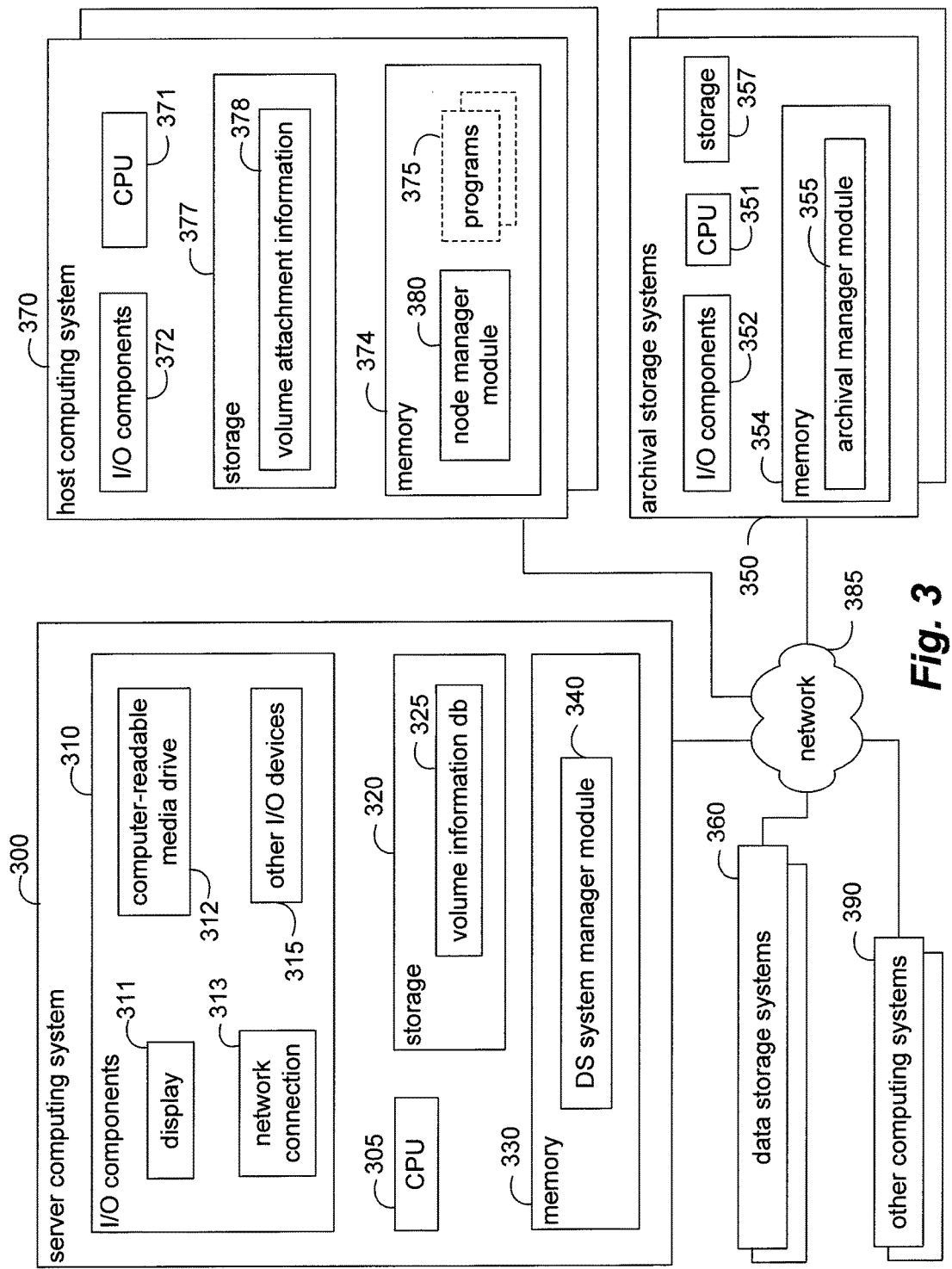
FIG. 3 is a block diagram illustrating example computing systems suitable for managing the provision to and use by clients of reliable data storage functionality.

FIG. 3 is a block diagram illustrating example computing systems suitable for managing the provision and use of reliable data storage functionality to clients. In this example, a server computing system 300 executes an embodiment of a DS system manager module 340 to manage provision of data storage functionality to programs executing on host computing systems 370 and/or on at least some other computing systems 390, such as to data storage volumes (not shown) provided by the data storage systems 360. Each of the host computing systems 370 in this example also executes an embodiment of a node manager module 380 to manage access of programs 375 executing on the host computing system to at least some of the data storage volumes, such as in a coordinated manner with the DS system manager module 340 over a network 385 (e.g., an internal network of a data center, not shown, that includes the computing systems 300, 360, 370, and optionally at least some of the other computing systems 390). In other embodiments, some or all of the node manager modules 380 may instead manage one or more other computing systems (e.g., other computing systems 390).

In addition, multiple data storage systems 360 are illustrated that each store at least some of the networked data storage volumes (not shown) used by the executing programs 375, with access to those volumes also provided over the network 385 in this example. One or more of the data storage systems 360 may also each store a server software component (not shown) that manages operation of one or more of the data storage systems 360, as well as various information (not shown) about the data that is stored by the data storage systems 360. Thus, in at least some embodiments, the server computing system 300 of FIG. 3 may correspond to the computing system 175 of FIG. 1, one or more of the node manager modules 115 and 125 of FIG. 1 may correspond to the node manager modules 380 of FIG. 3, and/or one or more of the data storage computing systems 360 of FIG. 3 may correspond to data storage systems 165 of FIG. 1. In addition, in this example embodiment, multiple archival storage systems 350 are illustrated, which may store snapshot copies and/or other copies of at least portions of at least some data storage volumes stored on the data storage systems 360. The archival storage systems 350 may also interact with some or all of the computing systems 300, 360, and 370, and in some embodiments may be remote archival storage systems (e.g., of a remote storage service, not shown) that interact with the computing systems 300, 360, and 370 over one or more other external networks (not shown).

The other computing systems 390 may further include other proximate or remote computing systems of various types in at least some embodiments, including computing systems via which customers or other users of the data storage service interact with the computing systems 300 and/or 370. Furthermore, one or more of the other computing systems 390 may further execute a PES system manager module to coordinate execution of programs on the host computing systems 370 and/or other host computing systems 390, or computing system 300 or one of the other illustrated computing systems may instead execute such a PES system manager module, although a PES system manager module is not illustrated in this example.

In this example embodiment, computing system 300 includes a CPU ("central processing unit") 305, local storage 320, memory 330, and various I/O ("input/output") components 310, with the illustrated I/O components in this example including a display 311, a computer-readable media drive 312, a network connection 313, and other I/O devices 315 (e.g., a keyboard, mouse, speakers, microphone, etc.). In the illustrated embodiment, the DS system manager module 340 is executing in memory 330, and one or more other programs (not shown) may also optionally be executing in memory 330.

Each computing system 370 similarly includes a CPU 371, local storage 377, memory 374, and various I/O components 372 (e.g., I/O components similar to I/O components 310 of server computing system 300). In the illustrated embodiment, a node manager module 380 is executing in memory 374 in order to manage one or more other programs 375 executing in memory 374 on the computing system, such as on behalf of customers of the program execution service and/or data storage service. In some embodiments, some or all of the computing systems 370 may host multiple virtual machines, and if so, each of the executing programs 375 may be an entire virtual machine image (e.g., with an operating system and one or more application programs) executing on a distinct hosted virtual machine computing node. The node manager module 380 may similarly be executing on another hosted virtual machine, such as a privileged virtual machine monitor that manages the other hosted virtual machines. In other embodiments, the executing program copies 375 and the node manager module 380 may execute as distinct processes on a single operating system (not shown) executed on computing system 370.

Each archival storage system 350 in this example is a computing system that includes a CPU 351, local storage 357, memory 354, and various I/O components 352 (e.g., I/O components similar to I/O components 310 of server computing system 300). In the illustrated embodiment, an archival manager module 355 is executing in memory 354 in order to manage operation of one or more of the archival storage systems 350, such as on behalf of customers of the data storage service and/or of a distinct storage service that provides the archival storage systems. In other embodiments, the archival manager module 355 may instead be executing on another computing system, such as one of the other computing systems 390 or on computing system 300 in conjunction with the DS system manager module 340. In addition, while not illustrated here, in some embodiments various information about the data that is stored by the archival storage systems 350 may be maintained on storage 357 or elsewhere, such as previously described with respect to FIG. 2E. Similarly, while not illustrated here, in some embodiments various information about the data that is stored by the data storage systems 360 may be maintained on storage of the data storage systems (not shown) or elsewhere, such as previously described with respect to FIG. 2E. Furthermore, while also not illustrated here, each of the data storage systems 360 and/or other computing systems 390 may similarly include some or all of the types of components illustrated with respect to the archival storage systems 350, such as a CPU, local storage, memory, and various I/O components.

The DS system manager module 340, archival manager module 355 and node manager module 380 may take various actions to manage the provision and use of reliable data storage functionality to clients (e.g., executing programs). In this example, the DS system manager module 340 may maintain a database 325 on storage 320 that includes information about volumes stored on the data storage systems 360 and/or on the archival storage systems 350 (e.g., for use in managing the volumes and snapshots), and may further store various other information (not shown) about users or other aspects of the data storage service. In other embodiments, information about volumes may be stored in other manners, such as in a distributed manner by node manager modules 380 on their computing systems and/or by other computing systems. In addition, in this example, each node manager module 380 on a host computing system 370 may store information 378 on local storage 377 about the current volumes attached to the host computing system and used by the executing programs 375 on the host computing system, such as to coordinate interactions with the data storage systems 360 that provide the primary copies of the volumes, and to determine how to switch to a mirror copy of a volume if the primary volume copy becomes unavailable.

It will be appreciated that computing systems 300, 350, 360, 370 and 390 are merely illustrative and are not intended to limit the scope of the present disclosure. For example, computing systems 300, 350, 360, 370 and/or 390 may be connected to other devices that are not illustrated, including through network 385 and/or one or more other networks, such as the Internet or via the World Wide Web ("Web"). More generally, a computing node or other computing system or data storage system may comprise any combination of hardware or software that can interact and perform the described types of functionality, including without limitation desktop or other computers, database servers, network storage devices and other network devices, PDAs, cell-phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments, the functionality of some of the illustrated modules may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

FIGS. 4A-4E are a flow diagram of an example embodiment of a DS system manager routine 400. The routine may be provided by, for example, execution of the data storage system manager module 175 of FIG. 1, the archival manager 190 of FIG. 2B, the DS system manager module 340 of FIG. 3, etc., such as to provide a data storage service for use by executing programs. In the illustrated embodiment, the routine may interact with multiple data storage systems at a single data center or other geographical location (e.g., if each such data center or other geographical location has a distinct embodiment of the routine executing at the geographical location), although in other embodiments a single routine 400 may support multiple distinct data centers or other geographical locations.

The illustrated embodiment of the routine begins at block 405, where a request or other information is received. The routine continues to block 410 to determine whether the received request was to read from volume, such as from a user of the data storage service and/or from an executing program that would like to access one or more data chunks of the volume, and if so continues to block 415. In the illustrated embodiment, the routine in block 415 determines whether the request is authorized, for example by checking whether the request is associated with a user authorized to read the requested data chunks of the volume, such as by checking stored information indicating whether a user is authorized to read from the volume (e.g., by checking stored information in a snapshot manifest of a snapshot associated with the volume, stored information about the volume, stored information about the user, etc.). If it is determined the read request is not authorized, the routine proceeds to block 417 where error processing occurs, such as reporting an unauthorized access request, returning an error message, etc. If it is instead determined the request is authorized, the routine proceeds to block 420.

At block 420, the routine determines whether the read request is directed to data chunks of an encrypted volume. If it is determined the read request is not directed to encrypted data, the routine proceeds to block 422, where a non-encrypted read is performed (e.g., the desired chunks of data are retrieved and provided to the requesting user). If it is instead determined the data read is directed to data chunks of an encrypted volume, the routine proceeds to block 425.

At block 425, the routine identifies and retrieves the encryption key(s) associated with respective requested data chunk(s). This may be done, for example, by reading stored information about the data chunks, such as information stored in data records associated with the volume, information stored in a snapshot manifest of a snapshot associated with the volume, etc., which identifies the encryption key(s) associated with the respective requested data chunk(s), and retrieving the identified encryption key(s) using the obtained information, for example from a key server, etc.

The routine proceeds from block 425 to block 427. At block 427, the routine identifies the location of the encrypted data chunk(s) and retrieves the encrypted data chunk(s). This may be done by, for example, reading stored information about the data chunks, such as information stored in data records associated with the volume, information stored in a snapshot manifest of a snapshot of the volume, etc., and retrieving the data chunks using the obtained information. In some embodiments, one or more of the data chunks may be in a volume stored in a data storage system, such as a data storage system 165 of FIG. 2A. In some embodiments, one or more of the data chunks may stored in one or more volume snapshots stored in an archive storage system, such as the archive storage systems 180 of FIG. 2B. In some embodiments, incremental snapshots may be employed such that a first chunk of a volume may be retrieved from a first volume snapshot, while a second chunk of the volume may be obtained from a second volume snapshot, based on a snapshot manifest of the first volume snapshot indicating the second data chunk is stored in the second volume snapshot. The routine 400 proceeds from block 427 to block 430.

At block 430, the routine decrypts the retrieved encrypted data chunk(s) using the respective retrieved encryption key(s). The routine 400 proceeds from block 430 to block 432, where the decrypted data chunks are provided, for example to a requesting user. The routine proceeds from blocks 417, 422 and 432 to block 495.

If it is not determined in block 410 that the request is a request to read from a volume, the routine proceeds to 435 to determine whether the request is a request to write to a volume, such as from a user of the data storage service and/or from an executing program that would like to write one or more data chunks to the volume, and if so continues to block 440. For example, a user may wish to write one or more modified chunks to a volume (such as one or more previously read chunks), a user may wish to create a new volume from a snapshot, such as a volume which is constructed from a copy of the snapshot (e.g., to recover a volume from a snapshot) or a modified copy of the snapshot, etc.

Figure 4A:
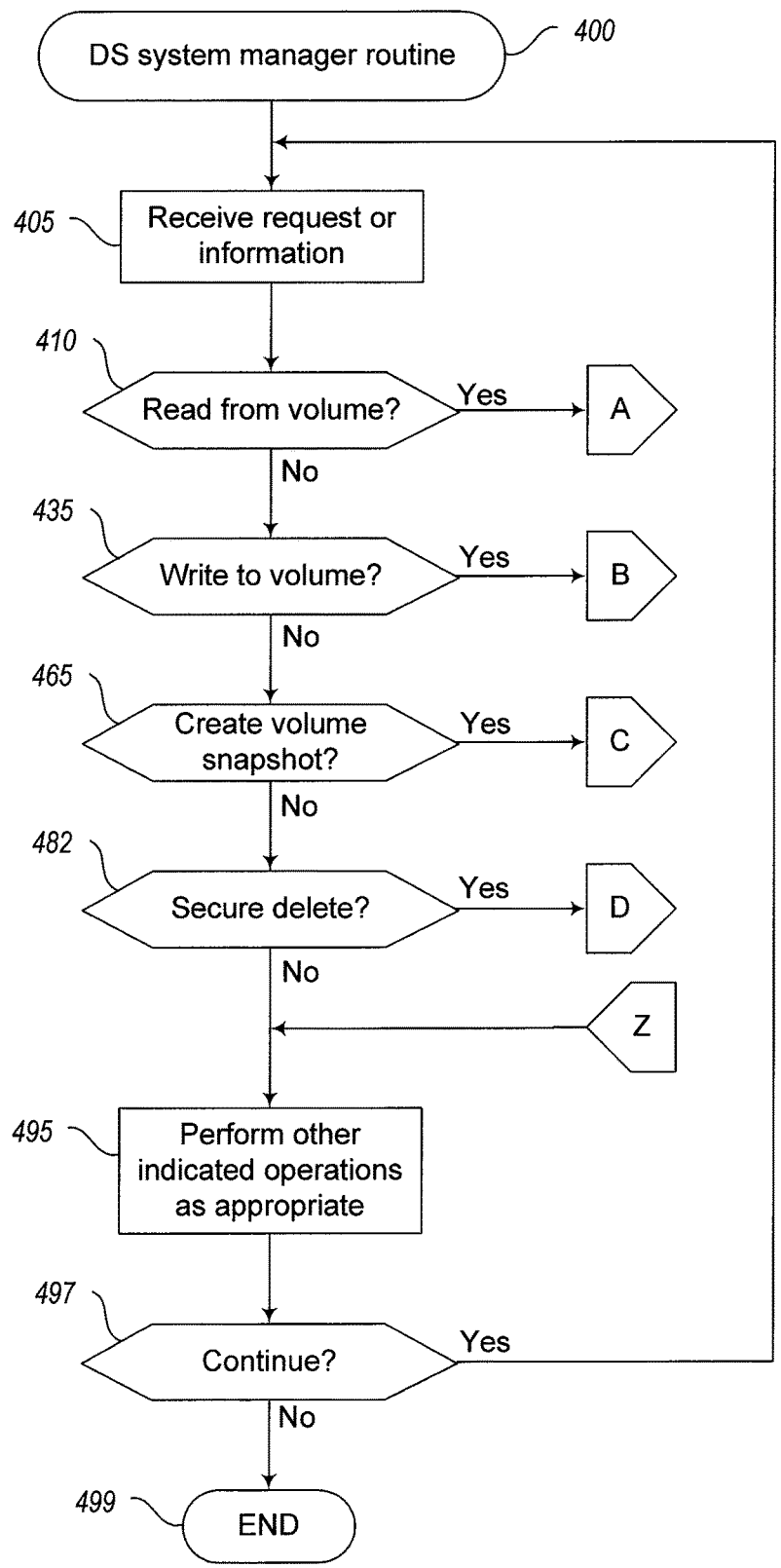
FIG. 4A-4E illustrate a flow diagram of an example embodiment of a data storage system manager routine.
Figure 4B:
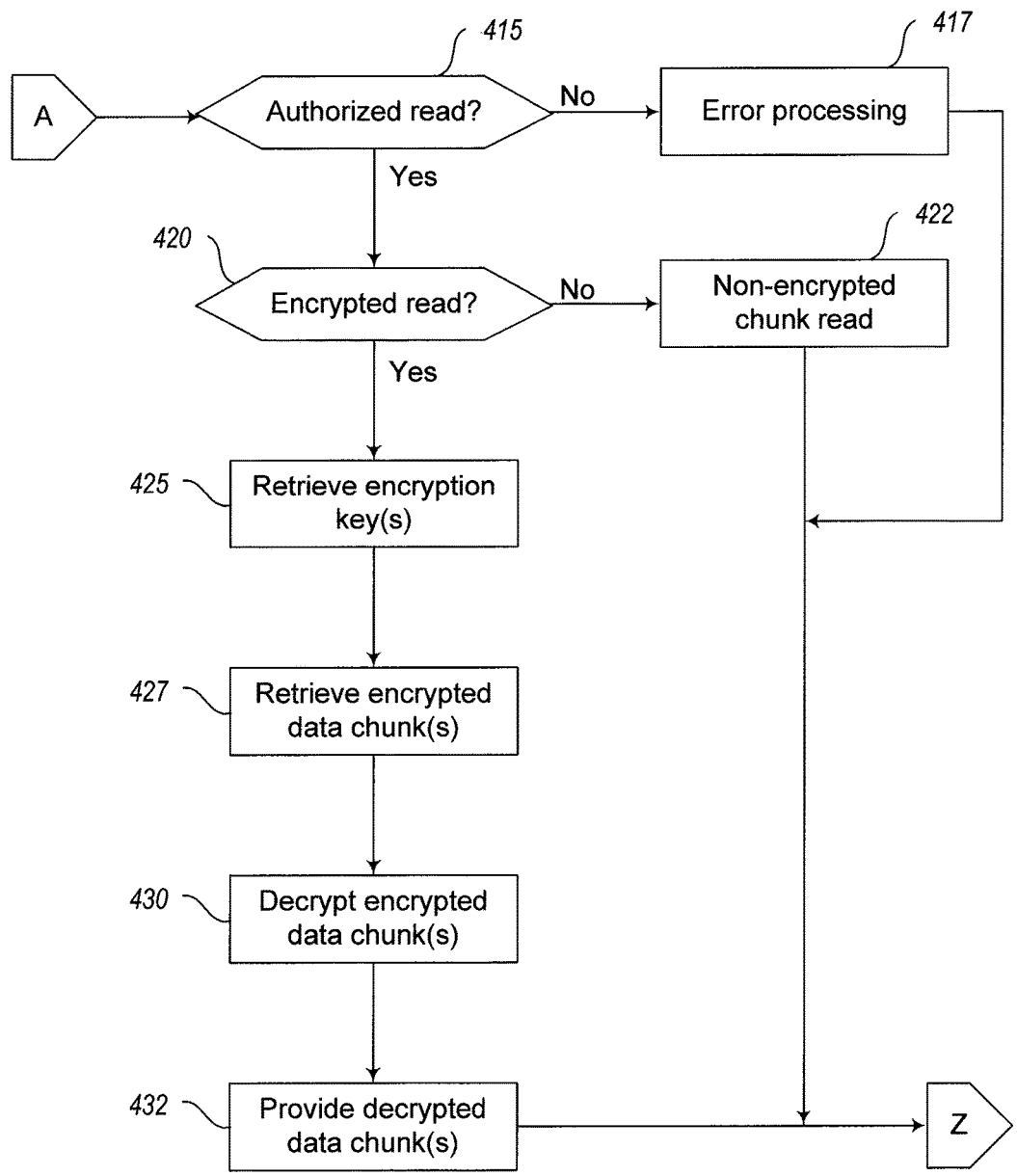
Figure 4C:
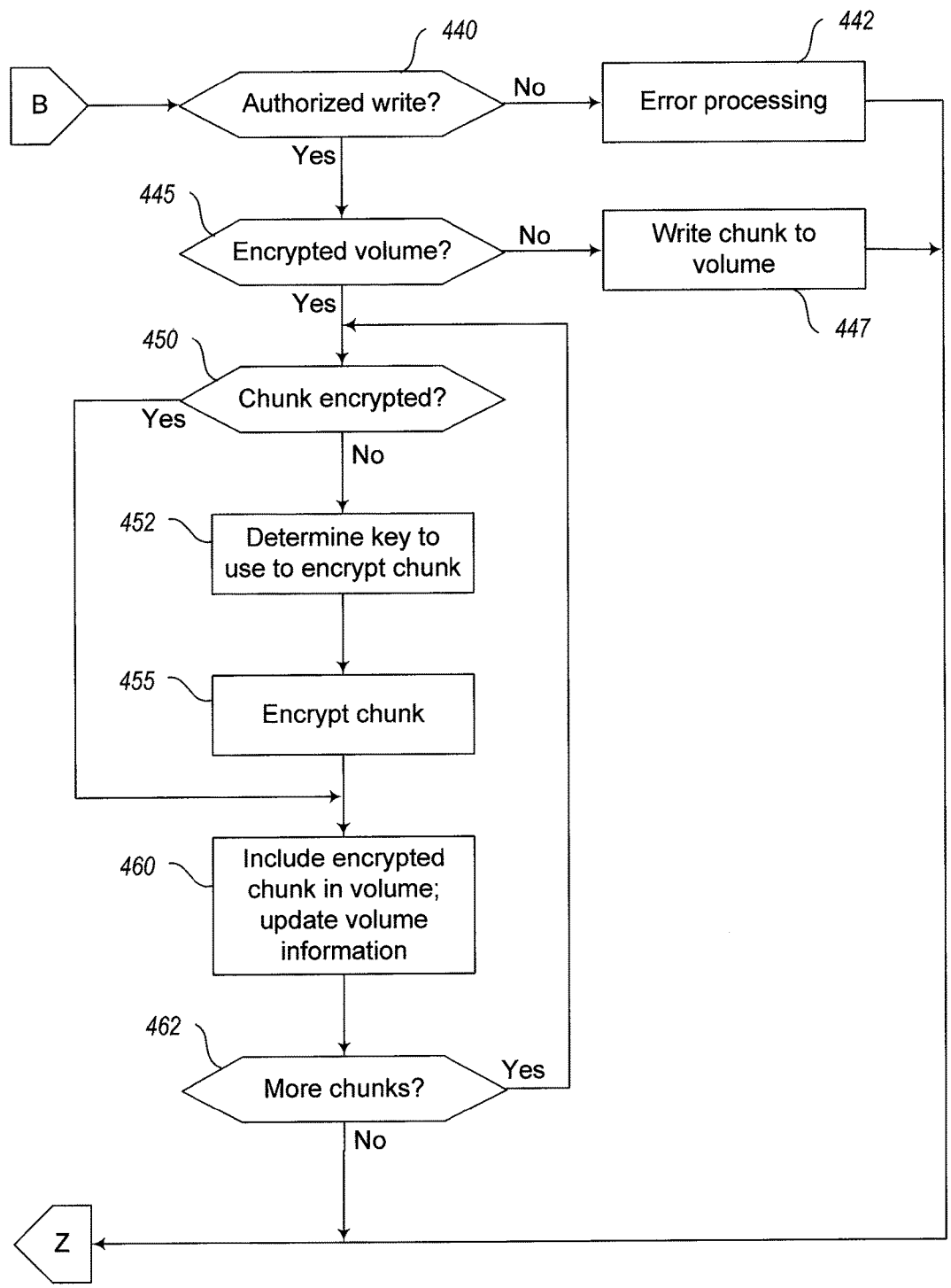

Turning to FIG. 4C, in the illustrated embodiment, the routine in block 440 determines whether the request is authorized, for example by checking whether the request is associated with a user authorized to write the requested data chunks to the volume. If it is determined the write request is not authorized, the routine proceeds to block 442 where error processing occurs, such as reporting an unauthorized write request, returning an error message, etc. If it is instead determined the request is authorized, the routine proceeds to block 445.

At block 445, the routine determines whether the write request is directed to a volume which stores data chunks in an encrypted form. If it is determined the write request is not directed to a volume which stores data in a encrypted form, the routine proceeds to block 447, where a non-encrypted write is performed (e.g., the chunks of data are written to the volume). If it is instead determined the data write is directed to a volume to store data chunks in an encrypted form, the routine proceeds to block 450.

At block 450, the routine determines whether a chunk to be written to the volume is already encrypted. For example, the volume may be a new volume initialized from a snapshot of a previous volume, with the request containing both encrypted chunks from the previous snapshot and new chunks (e.g., modified chunks from the previous snapshot, new chunks, etc.). The routine may determine whether a chunk to be written is already encrypted in various ways, such as by reading information from data records associated with the volume, reading information from a snapshot manifest, etc. For example, a snapshot manifest may identify encryption keys associated with respective data chunks, any chunks not on the manifest list of chunks or not associated with an encryption key in the manifest list may be determined to be unencrypted chunks.

When it is determined a chunk to be written is not encrypted, the routine 400 proceeds to block 452 to determine an encryption key to use to encrypt the chunk. The routine 400 may determine an encryption key to use to encrypt the chunk by assigning a unique encryption key to encrypt unencrypted chunks of the volume, by identifying a previous unique encryption key assigned to the volume (e.g., by reading information stored in records associated with the volume, etc.), etc. In some embodiments, each volume will have a unique encryption key to use to encrypt unencrypted chunks to be written to the volume.

The routine proceeds from block 452 to block 455, where it encrypts the chunk using the encryption key determined in block 452. The routine proceeds from block 455 to block 460. When it is determined in block 450 that the chunk is already encrypted, the routine proceeds from block 450 to block 460.

In block 460, the routine includes the encrypted chunk in the volume (e.g., writes the encrypted chunk in the volume, includes a pointer to the encrypted chunk in the volume, etc.) and updates stored information about the volume. The routine proceeds from block 460 to block 462, where the routine determines whether there are more chunks to write to the volume associated with the request. When it is determined there are more chunks to write to the volume, the routine proceeds from block 462 to block 450 to process a next chunk. When it is determined there are no more chunks to write to the volume associated with the request, the routine proceeds from block 462 to block 495. In some embodiments, the routine 400 may automatically create a snapshot of the volume after the chunks are written to the volume. The routine proceeds from blocks 442 and 447 to block 495.

If it is not determined in block 435 that the request is a request to write data chunks to a volume, the routine proceeds to 465 to determine whether the request is a request to create a snapshot of a volume, such as from a user of the data storage service and/or from an executing program that would like to create a snapshot of the volume, for example for backup purposes, and if so the routine proceeds to block 470.

Figure 4D:
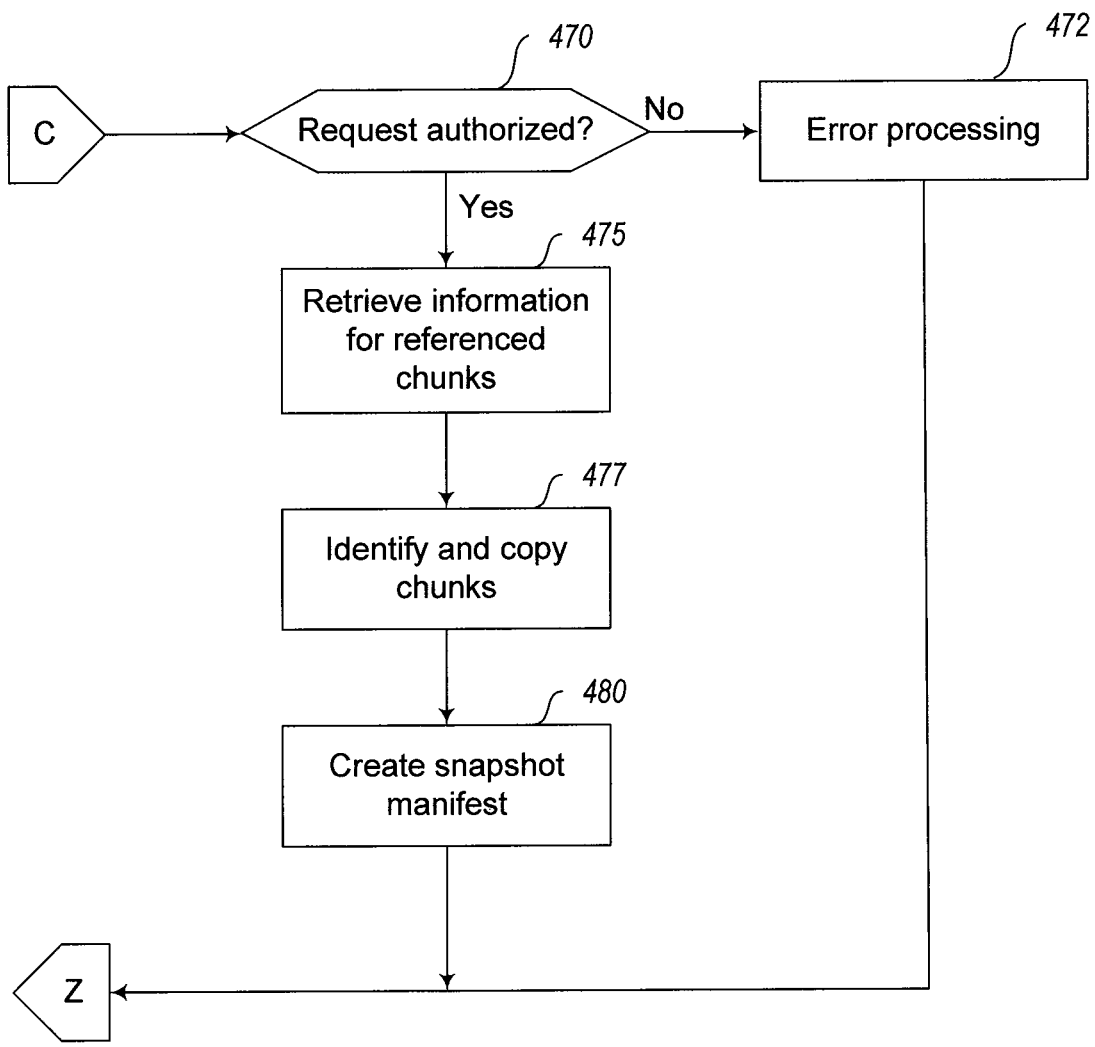

Turning to FIG. 4D, in the illustrated embodiment, the routine in block 470 determines whether the request is authorized, for example by checking whether the request is associated with a user authorized to make a snapshot of the volume. If it is determined the request to create a snapshot is not authorized, the routine proceeds to block 472 where error processing occurs, such as reporting an unauthorized request to create a snapshot, returning an error message, etc.

If it is instead determined the request is authorized, the routine proceeds to block 475.

At block 475, the routine identifies and retrieves information about chunks which will be referenced in the snapshot of the volume. For example, if the snapshot is to be an incremental snapshot, it may contain copies of chunks which are new or which have been modified since a previous snapshot, and references to chunks which have not changed since the previous snapshot, instead of copies of all of the chunks in the volume. The chunks to be referenced may be identified, for example, by comparing stored information about the volume, such as information in stored in records related to the volume, and a snapshot manifest of the previous volume. The information for referencing the chunks may be obtained, for example, from a snapshot manifest for the previous snapshot, and the information for referencing a chunk may include an indication of a snapshot storing the chunk and an indication of an encryption key that may be employed to decrypt the chunk. It is noted that the previous snapshot may itself be an incremental snapshot. It is also noted that if the snapshot to be created is not an incremental snapshot, no chunks to be referenced may be identified.

The routine proceeds from block 475 to block 477, where chunks to be copied to the snapshot of the volume are identified and copied to the snapshot. The chunks to be copied to the snapshot may be identified, for example, by comparing a snapshot manifest for a previous snapshot of the volume to stored information about the volume, such as information in stored in records related to the volume, by determining which chunks in a volume are encrypted using a unique encryption code identified with the volume, etc.

The routine proceeds from block 477 to block 480, where a snapshot manifest is created providing an indication of a snapshot where each data chunk of the snapshot of the volume is stored and an indication of an encryption key that may be used to decrypt the data chunk. In some embodiments, a volume snapshot manifest may store an indication of an encryption key that may be used to decrypt new chunks of the volume (e.g., newly created chunks or modified chunks) and a list of chunks associated with previous volumes together with indications of the associated volumes, without storing in the manifest keys used to decrypt the chunks associated with the previous volumes. The routine proceeds from blocks 472 and 480 to block 495.

When it is not determined in block 465 that the request is a request to create a volume snapshot, the routine proceeds to block 482 to determine whether the request is a request to securely delete encrypted data, such as from a user of the data storage service and/or from an executing program in response to an indication that a data spill has occurred. If it is determined that the request is a request to securely delete encrypted data, the routine proceeds to block 484.

Figure 4E:
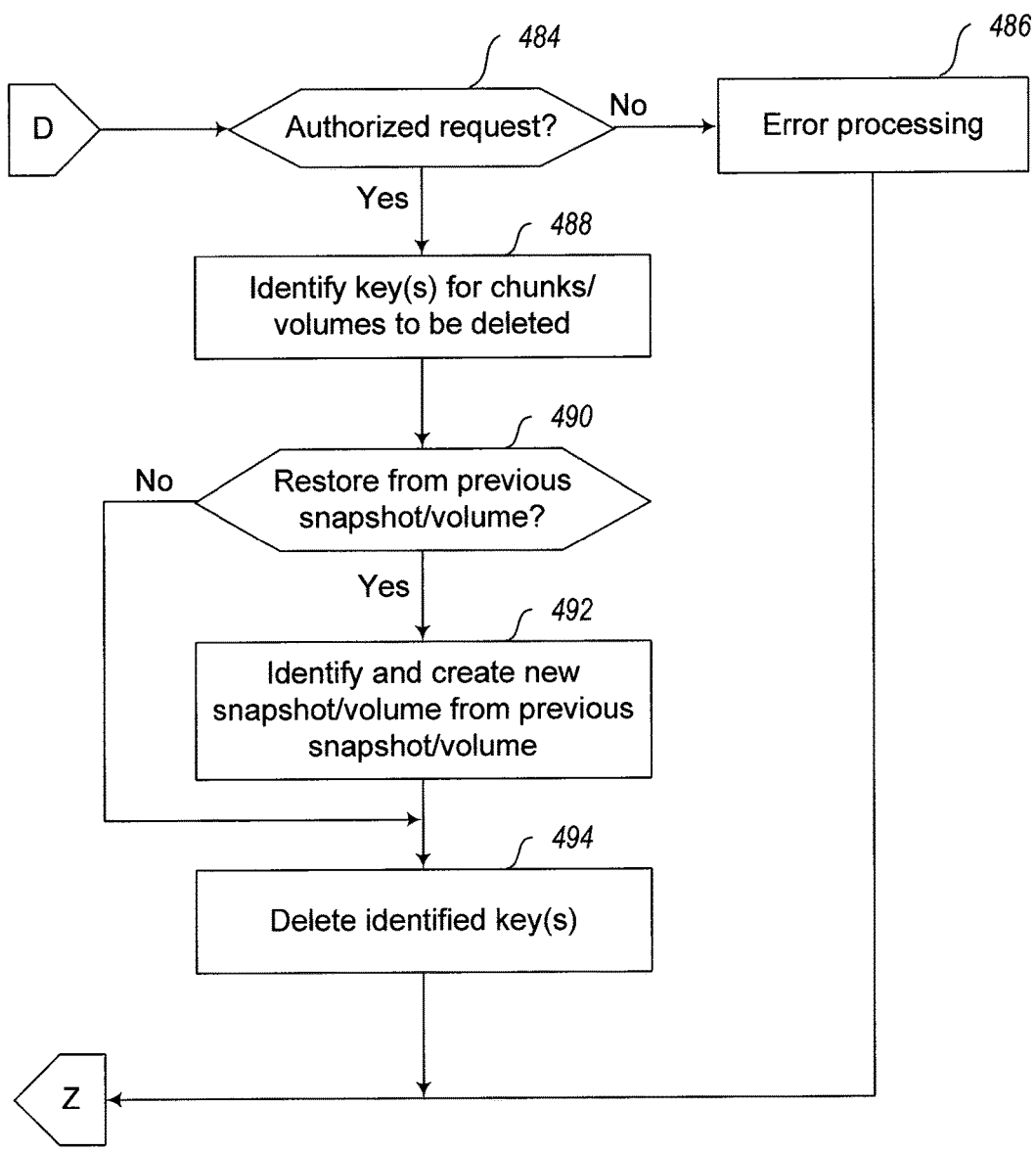

Turning to FIG. 4E, in the illustrated embodiment, the routine in block 484 determines whether the request is authorized, for example by checking whether the request is associated with a user authorized to delete the encrypted data, such as by checking stored information indicating whether a user is authorized to delete a volume, to delete chunks, etc. If it is determined the request to delete encrypted data is not authorized, the routine proceeds to block 486 where error processing occurs, such as reporting an unauthorized request to delete encrypted data, returning an error message, etc. If it is instead determined the request is authorized, the routine proceeds to block 488.

At block 488, the routine identifies one or more encryption keys associated with the chunks and/or volumes to be deleted (e.g., encryption keys associated with chunks of a data spill). The keys to be deleted may be identified, for example, based on the volume or chunks which are to be deleted and stored information, such as information stored in records associated with the volume containing chunks to be deleted, information stored in a snapshot manifest associated with the volume, etc.

The routine proceeds from block 488 to block 490, where it is determined whether to restore data from a previous snapshot or volume (e.g., an intermediate volume or snapshot between an initial volume and the volume containing the chunks of a data spill). If it is determined to restore from a previous volume or snapshot, the routine proceeds from block 490 to block 492. At block 492, a previous volume or snapshot is identified and a new encrypted volume and/or snapshot is created from the identified volume or snapshot. For example, some or all of the chunks of the identified volume or snapshot may be read and decrypted, and then re-encrypted using a new encryption key associated with the new volume and written to the new volume. The routine proceeds from blocks 486 and 494 to block 495.

If it is instead determined in block 482 that the received request is not a request to securely delete chunks or volumes, the routine continues instead to block 495 to perform one or more other indicated operations as appropriate. Other operations may have various forms in various embodiments, such as one or more of the following non-exclusive list: to create a volume which does not contain sensitive information (e.g., a non-encrypted volume); to attach a volume; to respond to a failure of a data storage system; to move a volume; to perform monitoring of some or all data storage systems (e.g., by sending ping messages or other status messages to the data storage systems and waiting for a response); to detach a volume; to delete other types of volumes; to track use of volumes and/or snapshot volume copies by users, such as to meter such usage for payment purposes; etc. After block 495, the routine continues to block 497 to determine whether to continue, such as until an explicit termination instruction is received. If so, the routine returns to block 405, and if not the routine continues to block 499 and ends.

In addition, in some embodiments, the verification of authorization may further include obtaining payment from the requester for the requested functionality (or verifying that any such payment has already been provided), such as to not perform the request if the payment is not provided. For example, types of request that may have associated payment in at least some embodiments and situations include requests to create a sensitive volume, to create other types of volumes, to attach a volume, to create a snapshot copy of a sensitive volume or other types of volumes, to move an indicated volume (e.g., to a premium data storage system), and other types of indicated operations. Furthermore, some or all types of actions taken on behalf of users may be monitored and metered, such as for later use in determining corresponding usage-based fees for at least some of those actions.

It will be appreciated that in some embodiments the functionality provided by the routines discussed above may be provided in alternative ways, such as being split among more routines or consolidated into fewer routines. Similarly, in some embodiments, illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, in other embodiments the operations may be performed in other orders and in other manners. Similarly, the data structures discussed above may be structured in different manners in other embodiments, such as by having a single data structure split into multiple data structures or by having multiple data structures consolidated into a single data structure, and may store more or less information than is described (e.g., when other illustrated data structures instead lack or include such information respectively, or when the amount or types of information that is stored is altered).

From the foregoing it will be appreciated that, although specific embodiments have been described herein for purposes of illustration, various modifications may be made without deviating from the spirit and scope of the disclosure. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method, comprising:
creating, by one or more computing systems, a hierarchy of multiple encrypted data volumes, including creating a parent data volume with a first set of encrypted data that is decryptable with a first decryption key, creating a first child data volume that inherits from the parent data volume the first set of encrypted data decryptable with the first decryption key and that further includes an additional second set of encrypted data decryptable with a second decryption key, and creating a second child data volume as a snapshot of the first child data volume that includes from the first data volume the first set of encrypted data and the additional second set of encrypted data;
providing, by the one or more computing systems, access to data stored in the second child data volume by retrieving the first and second decryption keys and by using the retrieved first and second decryption keys to decrypt the first and second sets of encrypted data in the second child data volume;
receiving, by the one or more computing systems, a request to delete the first child data volume;
responding, by the one or more computing systems and after the providing of the access to the data stored in the second child data volume, to the request by deleting the second decryption key associated with the additional second set of encrypted data while maintaining the first decryption key associated with the first set of encrypted data in the parent data volume; and
preventing, by the one or more computing systems and based at least in part on the deleting of the second decryption key, access to data stored in the second child data volume that includes at least the additional second set of encrypted data, while maintaining access to the first set of encrypted data stored in the parent data volume via the first decryption key.

2. The computer-implemented method of claim 1 wherein the creating of the second child data volume includes adding to the second child data volume a third set of encrypted data decryptable with a third decryption key specific to the second child data volume.

3. The computer-implemented method of claim 2 wherein the creating of the second child data volume includes storing a snapshot manifest for the second child data volume that includes information associating the first set of encrypted data with the first decryption key, and associating the second set of encrypted data with the second decryption key.

4. The computer-implemented method of claim 3 wherein the information stored in the snapshot manifest includes a first identifier used to retrieve the first decryption key from a key store and a second identifier used to retrieve the second decryption key from the key store, and wherein the retrieving of the first and second decryption keys includes using the first and second identifiers to retrieve the first and second decryption keys from the key store.

5. The computer-implemented method of claim 1 wherein the creating of the second child data volume includes copying the additional second set of encrypted data from the first child data volume to the second child data volume.

6. The computer-implemented method of claim 1 wherein the creating of the second child data volume includes storing an address for the second child data volume that references the additional second set of encrypted data stored in the first child data volume.

7. The computer-implemented method of claim 2 wherein the creating of the second child data volume further includes encrypting a third set of encrypted data in the second child data volume to be decryptable with the third decryption key without encrypting the first and second sets of encrypted data for the second child data volume to be decryptable with the third decryption key.

8. The computer-implemented method of claim 2 further comprising, before the deleting of the second decryption key, receiving an additional request to delete the third set of encrypted data from the second child data volume, and responding to the additional request by deleting the third decryption key specific to the second child data volume.

9. The computer-implemented method of claim 1 further comprising providing, by the one or more computing systems and after the deleting of the second decryption key, access to data stored in the second child data volume that includes at least the first set of encrypted data from the parent data volume by using the first decryption key for the parent data volume.

10. A non-transitory computer-readable medium having stored executable instructions that, upon execution by a computing system, cause the computing system to at least:
create, on a single storage device, a hierarchy of multiple encrypted data volumes, including creating a parent data volume with a first set of encrypted data that is decryptable with a first decryption key specific to the parent data volume, creating a first child data volume that inherits from the parent data volume the first set of encrypted data decryptable with the first decryption key and that further includes an additional second set of encrypted data decryptable with a second decryption key specific to the first child data volume, and creating a second child data volume from a snapshot of the first child data volume with the first set of encrypted data decryptable using the first decryption key and with the additional second set of encrypted data decryptable using the second decryption key and that further includes a third set of encrypted data decryptable with a third decryption key specific to the second child data volume, wherein the first decryption key is needed to access data stored in the parent data volume, wherein the first decryption key and the second decryption key are needed to access all data stored in the first child data volume, and wherein the first decryption key and the second decryption key and the third decryption key are needed to access all data stored in the second child data volume;
provide, by the computing system, access to data stored in the second child data volume by retrieving the first and second decryption keys and by using the retrieved first and second decryption keys to decrypt the first and second sets of encrypted data in the second child data volume;
receive, by the computing system, a request to delete the first child data volume;
respond, by the computing system and after the providing of the access to the data stored in the second child data volume, to the request by deleting the second decryption key specific to the first child data volume while maintaining access to some of the data stored in the second child data volume, including maintaining the first decryption key specific to the parent data volume and the third decryption key specific to the second child data volume;
provide, by the computing system and after the deleting of the second decryption key, access to the first set of encrypted data stored in the parent data volume by using the first decryption key to decrypt data of the first set; and
provide, by the computing system and based at least in part on the deleting of the second decryption key, access to the some data in the second child data volume while preventing access to the additional second set of encrypted data in the second child data volume that is inherited from the first child data volume, including using the first and third decryption keys to decrypt the first and third sets of encrypted data in the second child data volume.

11. The non-transitory computer-readable medium of claim 10 wherein the creating of the second child data volume includes adding the third set of encrypted data decryptable with the third decryption key to the snapshot of the first child data volume.

12. The non-transitory computer-readable medium of claim 11 wherein the creating of the second child data volume includes creating a snapshot manifest for the second child data volume that includes information associating the first set of encrypted data with the first decryption key for the parent data volume, and associating the second set of encrypted data with the second decryption key for the first child data volume, and associating the third set of encrypted data with the third decryption key for the second child data volume.

13. The non-transitory computer-readable medium of claim 12 wherein the information stored in the snapshot manifest includes a first identifier used to retrieve the first decryption key from a key store and a second identifier used to retrieve the second decryption key from the key store, and wherein the retrieving of the first and second decryption keys includes using the first and second identifiers to retrieve the first and second decryption keys from the key store.

14. The non-transitory computer-readable medium of claim 10 wherein the creating of the second child data volume includes encrypting the third set of encrypted data in the second child data volume to be decryptable with the third decryption key without encrypting the first and second sets of encrypted data for the second child data volume to be decryptable with the third decryption key.

15. The non-transitory computer-readable medium of claim 10 wherein the stored executable instructions further cause the computing system to, after the deleting of the second decryption key, receive an additional request to delete the third set of encrypted data from the second child data volume, and respond to the additional request by deleting the third decryption key specific to the second child data volume.

16. The non-transitory computer-readable medium of claim 10 wherein the creating of the second child data volume includes copying the additional second set of encrypted data from the first child data volume to the second child data volume and maintaining the copied additional second set of encrypted data as being decryptable with the second decryption key while not providing access to the copied additional second set of encrypted data in the second child data volume using the third decryption key.

17. The non-transitory computer-readable medium of claim 10 wherein the creating of the second child data volume includes storing an address in information for the second child data volume that references the additional second set of encrypted data stored in the first child data volume.

18. A system, comprising:
one or more hardware processors of one or more computing systems; and
a memory including instructions that, when executed by at least one of the one or more hardware processors, cause the system to:
create multiple encrypted data volumes, including creating a parent data volume with a first set of encrypted data that is decryptable with a first decryption key specific to the parent data volume, creating a first child data volume that inherits from the parent data volume the first set of encrypted data decryptable with the first decryption key and that further includes an additional second set of encrypted data decryptable with a second decryption key specific to the first child data volume, and creating a second child data volume from a snapshot of the first child data volume with the first set of encrypted data decryptable with the first decryption key and with the additional second set of encrypted data decryptable with the second decryption key and that further includes a third set of encrypted data decryptable with a third decryption key specific to the second child data volume, wherein the first decryption key is needed to access data stored in the parent data volume, wherein the first decryption key and the second decryption key are needed to access all data stored in the first child data volume, and wherein the first decryption key and the second decryption key and the third decryption key are needed to access all data stored in the second child data volume;
provide access to data stored in the second child data volume by retrieving the first and second decryption keys and by using the retrieved first and second decryption keys to decrypt the first and second sets of encrypted data in the second child data volume;
receive a request to delete the first child data volume;
respond to the request by, after the providing of the access to the data stored in the second child data volume, deleting the second decryption key specific to the first child data volume while maintaining the first decryption key specific to the parent data volume;
provide, after the deleting of the second decryption key, access to the first set of encrypted data stored in the parent data volume by using the first decryption key to decrypt data of the first set; and
prevent, based at least in part on the deleting of the second decryption key, access to the second child data volume.

19. The system of claim 18 wherein the creating of the second child data volume includes adding the third set of encrypted data decryptable with the third decryption key to the snapshot of the first child data volume.

20. The system of claim 19 wherein the creating of the second child data volume includes creating a snapshot manifest for the second child data volume that includes information associating the first set of encrypted data with the first decryption key for the parent data volume, and associating the second set of encrypted data with the second decryption key for the first child data volume, and associating the third set of encrypted data with the third decryption key for the second child data volume.

21. The system of claim 20, wherein the information stored in the snapshot manifest includes a first identifier used to retrieve the first decryption key from a key store and a second identifier used to retrieve the second decryption key from the key store, and wherein the retrieving of the first and second decryption keys includes using the first and second identifiers to retrieve the first and second decryption keys from the key store.

22. The system of claim 18 wherein the creating of the second child data volume includes encrypting the third set of encrypted data in the second child data volume to be decryptable with the third decryption key without encrypting the first and second sets of encrypted data for the second child data volume to be decryptable with the third decryption key.

23. The system of claim 18 wherein the instructions cause the system to further respond to the request to delete the first child data volume by deleting the third decryption key specific to the second child data volume.

24. The system of claim 18 wherein the creating of the second child data volume includes copying the additional second set of encrypted data from the first child data volume to the second child data volume and maintaining the copied additional second set of encrypted data as being decryptable with the second decryption key while not providing access to the copied additional second set of encrypted data in the second child data volume using the third decryption key.

25. The system of claim 18 wherein the creating of the second child data volume includes storing an address in information for the second child data volume that references the additional second set of encrypted data stored in the first child data volume.

* * * * *